US008458292B2

(12) United States Patent
Polis et al.

(10) Patent No.: US 8,458,292 B2
(45) Date of Patent: *Jun. 4, 2013

(54) AGGREGATION SYSTEM

(76) Inventors: Jared Polis, Boulder, CO (US); Payal Goyal, Broomfield, CO (US); Jeffery D Herman, Boulder, CO (US); Samuel C Wu, Lakewood, CO (US); Eric Wu, Broomfield, CO (US); Michael C Wilson, Boulder, CO (US); Chris Young, Wildwood, MO (US); Andrew Hyde, Boulder, CO (US); Michael D. McMahon, Centennial, CO (US); Andrew Hartman, Boulder, CO (US); Peter K. Trzyna, Chicago, IL (US); David L. Calone, Babylon, NY (US); Scott Shaver, Westminster, CO (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/565,466

(22) Filed: Aug. 2, 2012

(65) Prior Publication Data
US 2012/0297026 A1 Nov. 22, 2012

Related U.S. Application Data

(63) Continuation of application No. 13/426,356, filed on Mar. 21, 2012, which is a continuation of application No. 13/079,533, filed on Apr. 4, 2011, now Pat. No. 8,296,360, which is a continuation of application No. 13/022,606, filed on Feb. 7, 2011, now Pat. No. 8,156,183, which is a continuation of application No. 12/711,442, filed on Feb. 24, 2010, now Pat. No. 7,886,000, which is a continuation-in-part of application No. 11/823,836, filed on Jun. 27, 2007, now Pat. No. 7,673,327, said application No. 13/022,606 is a continuation-in-part of application No.

(Continued)

(51) Int. Cl.
*G06F 15/16* (2006.01)
*G06F 11/07* (2006.01)

(52) U.S. Cl.
USPC ........... 709/217; 709/203; 709/206; 709/245; 709/220; 709/226; 709/201; 709/207; 709/247; 713/152; 713/151; 713/153; 713/168; 713/169; 726/5; 726/17; 726/28; 726/29; 726/30

(58) Field of Classification Search
USPC ................. 709/203, 201, 202, 217, 218–229, 709/206, 245, 207, 247
See application file for complete search history.

(56) References Cited

U.S. PATENT DOCUMENTS

| 6,904,052 | B1 * | 6/2005 | Soubra et al. | 370/465 |
| 7,673,327 | B1 * | 3/2010 | Polis et al. | 726/5 |

(Continued)

*Primary Examiner* — Jude Jean Gilles
(74) *Attorney, Agent, or Firm* — Peter K. Trzyna, Esq.

(57) ABSTRACT

A computerized aggregation system, the system including: a master server system programmed to receive data from a user computer, to store the received data, and to process the received data to produce information including credentials, and to provide the information to a client-side application piece at the user computer system, the user computer system adapted to receive said provided information and to communicate said credentials received from the master server system respectively to each of a plurality of third party server systems to facilitate obtaining information from the third party server systems, whereby the user computer system is enabled to aggregate at least some information from the third party server systems on an aggregation template.

26 Claims, 21 Drawing Sheets

Related U.S. Application Data

12/194,531, filed on Aug. 19, 2008, now Pat. No. 7,908,647, which is a continuation-in-part of application No. 11/823,836, filed on Jun. 27, 2007, now Pat. No. 7,673,327, said application No. 12/711,442 is a continuation-in-part of application No. 12/194,531, filed on Aug. 19, 2008, now Pat. No. 7,908,647.

(60) Provisional application No. 60/816,692, filed on Jun. 27, 2006, provisional application No. 60/850,448, filed on Oct. 10, 2006, provisional application No. 60/872,690, filed on Dec. 4, 2006, provisional application No. 60/872,688, filed on Dec. 4, 2006, provisional application No. 60/872,689, filed on Dec. 4, 2006, provisional application No. 60/874,202, filed on Dec. 11, 2006, provisional application No. 60/900,939, filed on Feb. 12, 2007, provisional application No. 60/934,249, filed on Jun. 12, 2007, provisional application No. 60/994,092, filed on Sep. 17, 2007, provisional application No. 61/009,642, filed on Dec. 31, 2007, provisional application No. 60/189,319, filed on Aug. 15, 2008, provisional application No. 60/965,442, filed on Aug. 20, 2007.

(56) References Cited

U.S. PATENT DOCUMENTS

| | | | |
|---|---|---|---|
| 7,730,136 B2 | 6/2010 | Smith et al. | |
| 7,886,000 B1 * | 2/2011 | Polis et al. | 709/203 |
| 7,908,647 B1 * | 3/2011 | Polis et al. | 726/5 |
| 8,156,183 B2 * | 4/2012 | Polis et al. | 709/203 |
| 2003/0204568 A1 | 10/2003 | Bhargava et al. | |
| 2004/0181580 A1 | 9/2004 | Baranshamaje | |
| 2007/0061393 A1 * | 3/2007 | Moore | 709/201 |

* cited by examiner

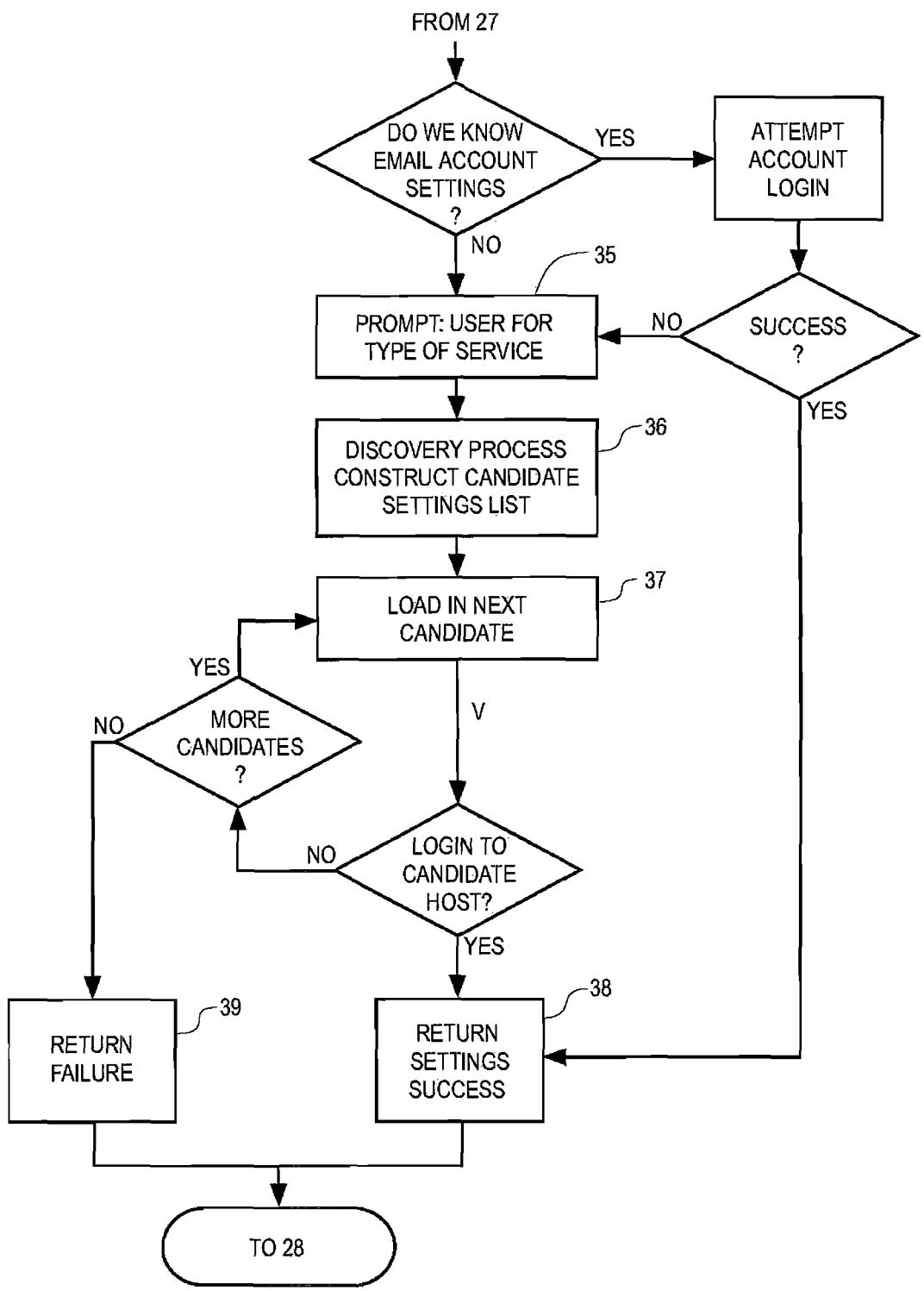

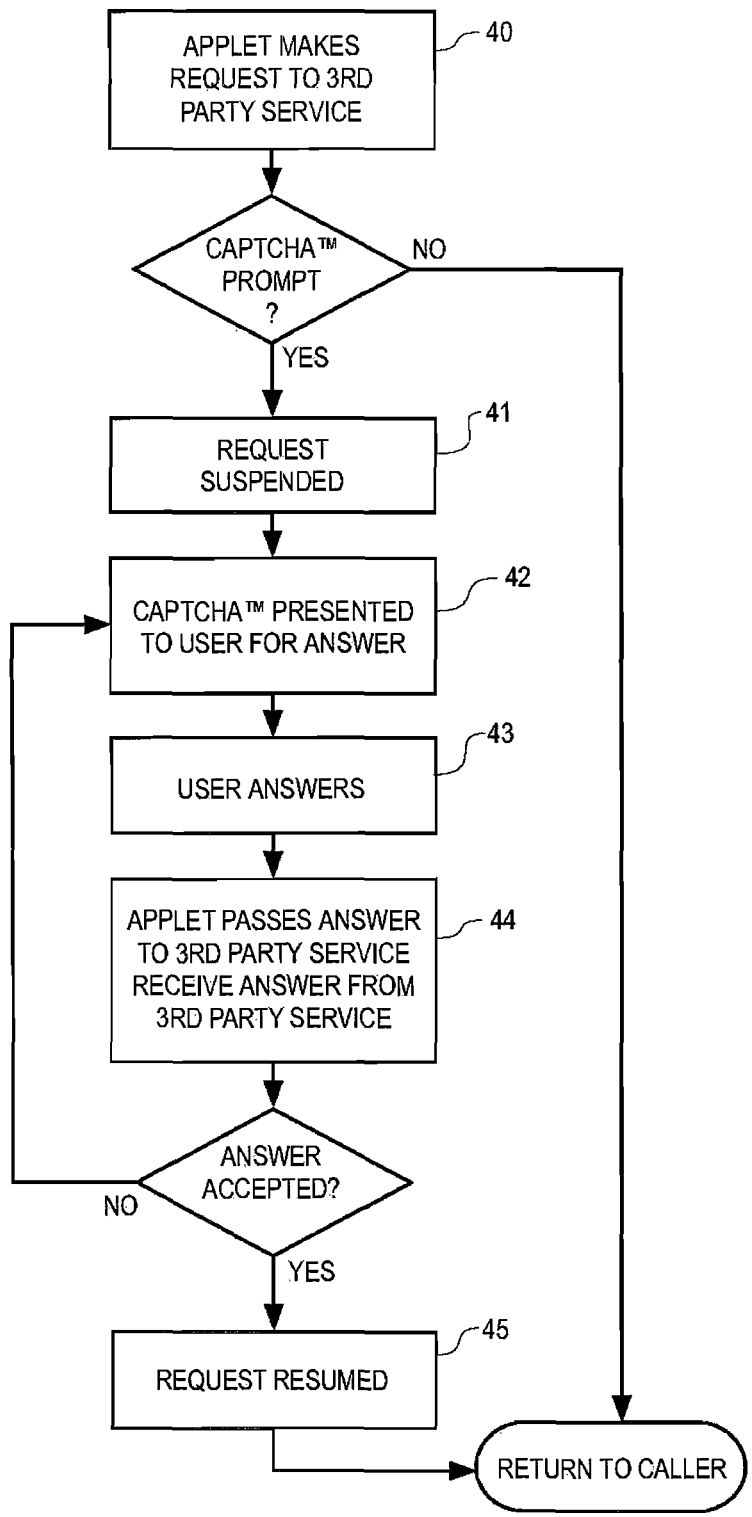

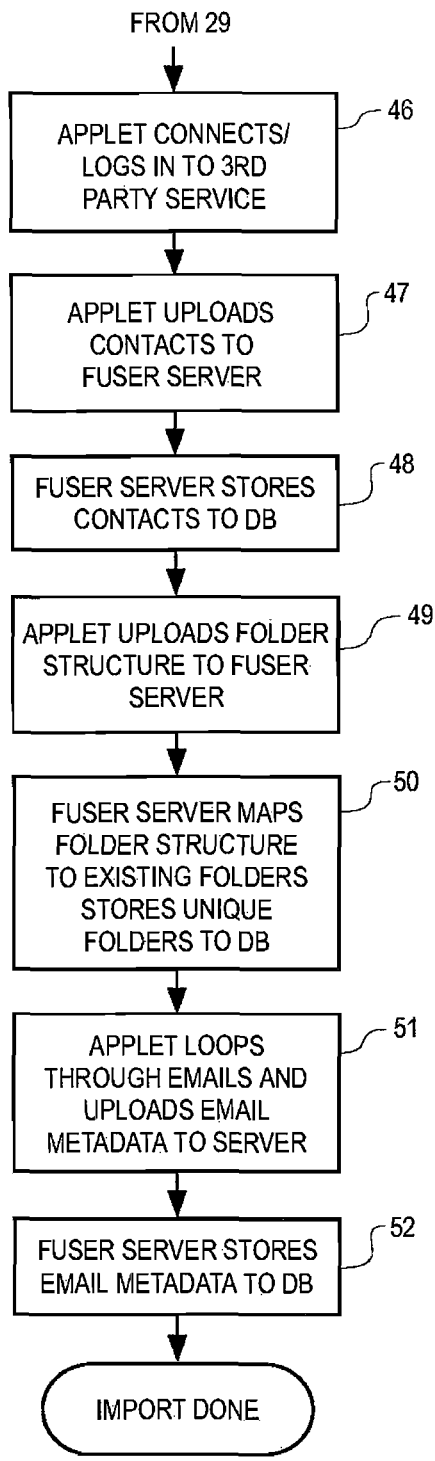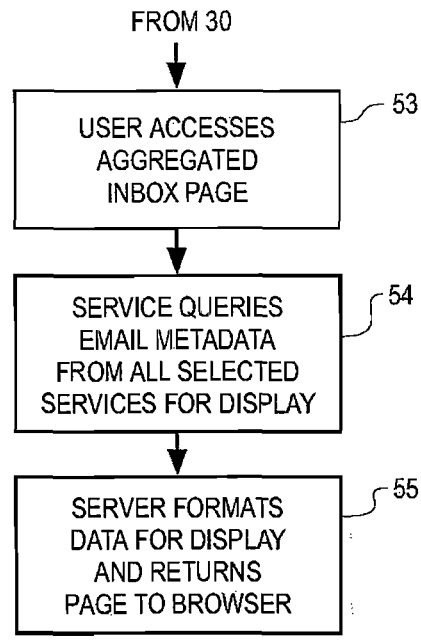

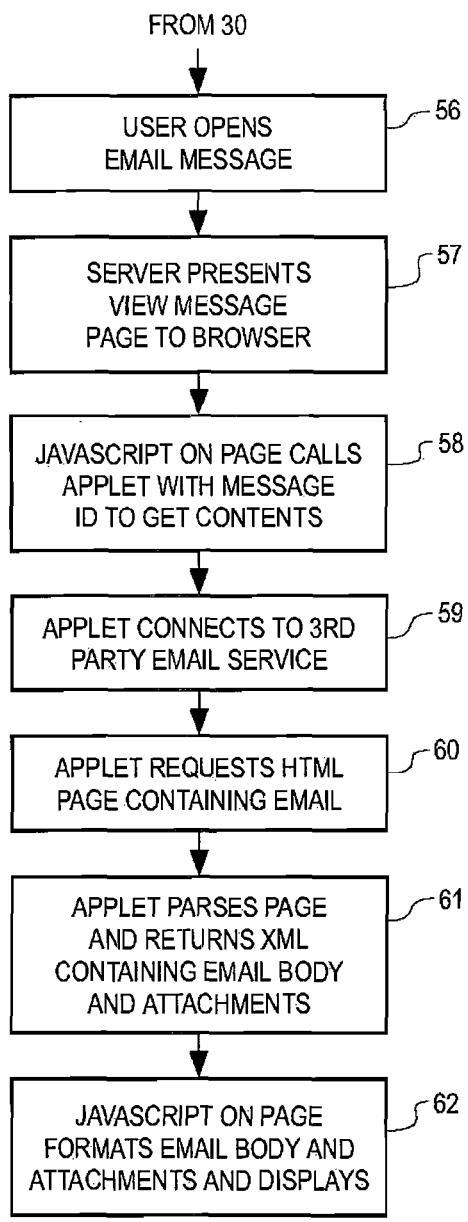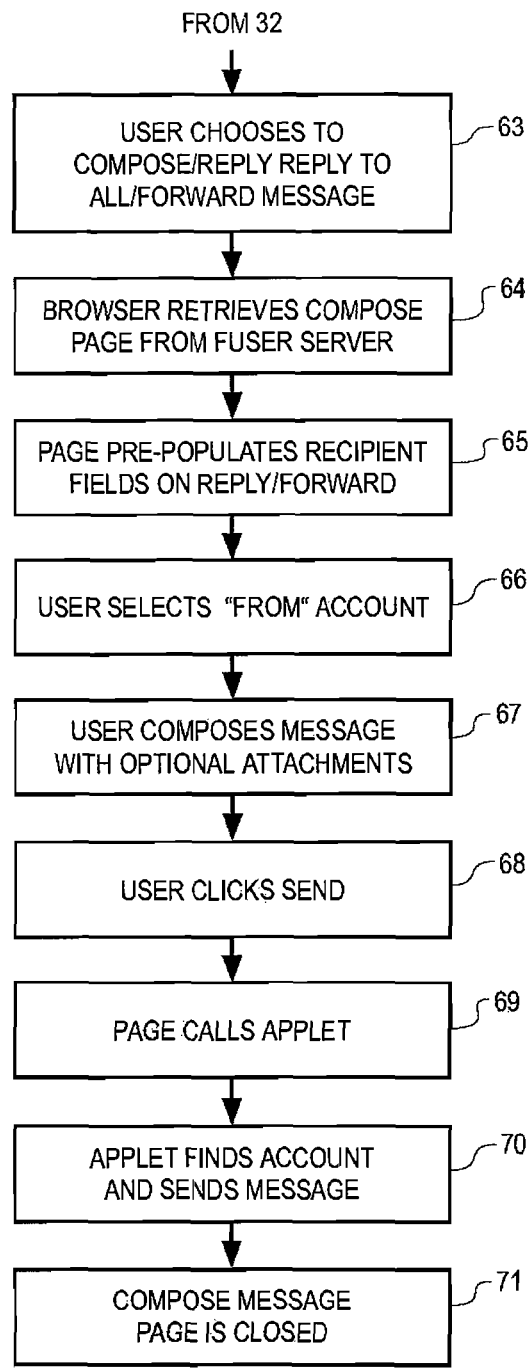

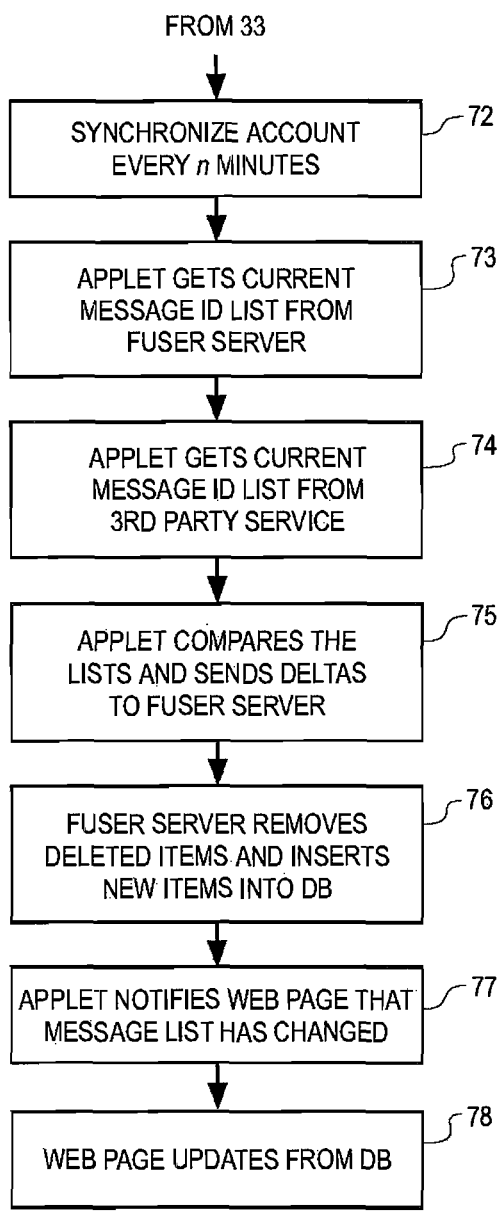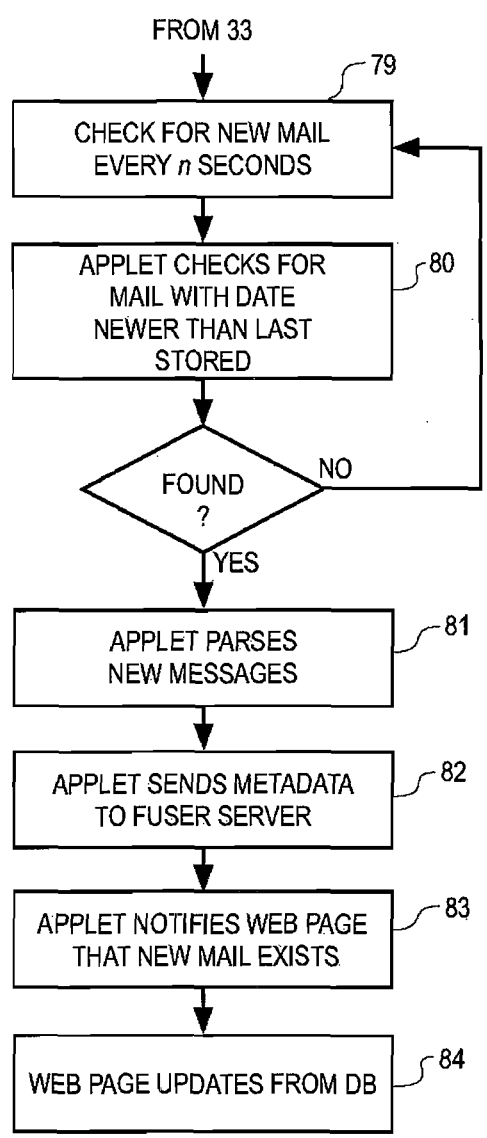
Fig. 14
ACCOUNT SYNCH PROCESS
Fig. 15
NEW MAIL CHECK

SOCIAL NETWORKING OVERVIEW

IM/IRC OVERVIEW

MULTIMEDIA OVERVIEW

E-COMMERCE OVERVIEW

FORUMS OVERVIEW

AGGREGATION SYSTEM

I. PRIORITY STATEMENT

The present patent application is a continuation of, and incorporates by reference as if fully restated herein, U.S. patent application Ser. No. 13/426,356, filed on Mar. 21, 2012, pending. U.S. patent application Ser. No. 13/426,356 is a continuation of, and incorporates by reference from as if fully restated therein, U.S. patent application Ser. No. 13/079,533, filed on Apr. 4, 2011, pending. U.S. patent application Ser. No. 13/079,533 is a continuation of, and incorporates by reference from as if fully restated therein, U.S. patent application Ser. No. 13/022,606, filed on Feb. 7, 2011, issued as U.S. Pat. No. 8,156,183 on Apr. 10, 2012, which is a continuation of, and incorporates by reference from as if fully restated therein, U.S. patent application Ser. No. 12/711,442, filed on Feb. 24, 2010, issued as U.S. Pat. No. 7,886,000 on Feb. 8, 2011, and is a continuation-in-part of, and incorporates by reference from as if fully restated therein, Ser. No. 12/194,531 filed Aug. 19, 2008, which issued as U.S. Pat. No. 7,908,647 on Mar. 15, 2011.

Ser. No. 12/711,442 is a continuation-in-part of, and claims priority from Ser. No. 11/823,836 filed Jun. 27, 2007, which issued as U.S. Pat. No. 7,673,327 on Mar. 2, 2010, which claims benefit from, and incorporates by reference from: U.S. Patent Application Ser. Nos. 60/816,692 filed Jun. 27, 2006; 60/850,448 filed Oct. 10, 2006; 60/872,690 filed Dec. 4, 2006; 60/872,688 filed Dec. 4, 2006; 60/872,689 filed Dec. 4, 2006; 60/874,202 filed Dec. 11, 2006; 60/900,939 filed Feb. 12, 2007; and 60/934,249 filed Jun. 12, 2007. Ser. No. 12/711,442 is also is a continuation-in-part of, and claims priority from Ser. No. 12/194,531, filed Aug. 19, 2008, which issued as U.S. Pat. No. 7,908,647 on Mar. 15, 2011, which claims benefit from Ser. Nos. 60/965,442 filed Aug. 20, 2007; 60/994,092 filed Sep. 17, 2007; 61/009,642 filed Dec. 31, 2007; 61/189,319 filed Aug. 15, 2008. Ser. No. 12/194,531, filed Aug. 19, 2008, is also a continuation-in-part of Ser. No. 11/823,836 filed Jun. 27, 2007 which issued as U.S. Pat. No. 7,673,327 on Mar. 2, 2010. The present patent application incorporates by reference all of the patent applications and patents listed above.

II. TECHNICAL FIELD

The technical field is computers and data processing systems. Depending on the implementation, there is apparatus, a method for use and method for making, and corresponding products produced thereby, as well as data structures, computer-readable media tangibly embodying program instructions, manufactures, and necessary intermediates of the foregoing, each pertaining to digital aspects of an aggregator system or computing as may be related thereto.

III. BRIEF DESCRIPTION OF THE DRAWINGS

FIG. 8 illustrates an embodiment, with particular regard to a Discovery logic.

FIG. 9 illustrates an embodiment, with particular regard to a CAPTCHA process.

FIG. 10 illustrates an embodiment, with particular regard to an Initial account import process.

FIG. 11 illustrates an embodiment, with particular regard to a Mail display process.

FIG. 12 illustrates an embodiment, with particular regard to a View message process.

FIG. 13 illustrates an embodiment, with particular regard to a Compose message process.

FIG. 14 illustrates an embodiment, with particular regard to an Account synchronization process.

FIG. 15 illustrates an embodiment, with particular regard to a New mail check process.

FIG. 22 illustrates an embodiment, with particular regard to a user interface.

Figure 23:
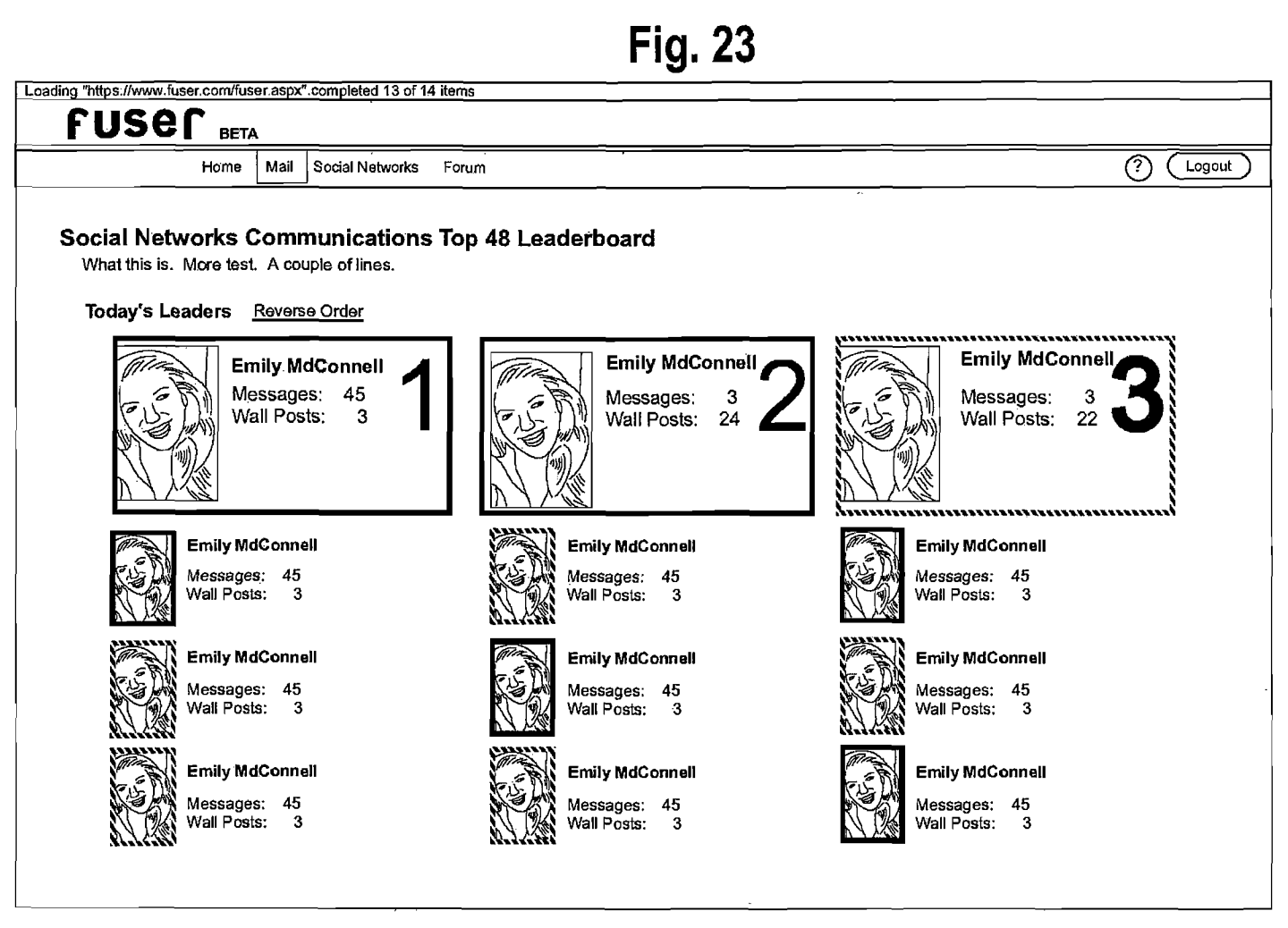

FIG. 23 illustrates an embodiment, with particular regard to a user interface.

Figure 26:
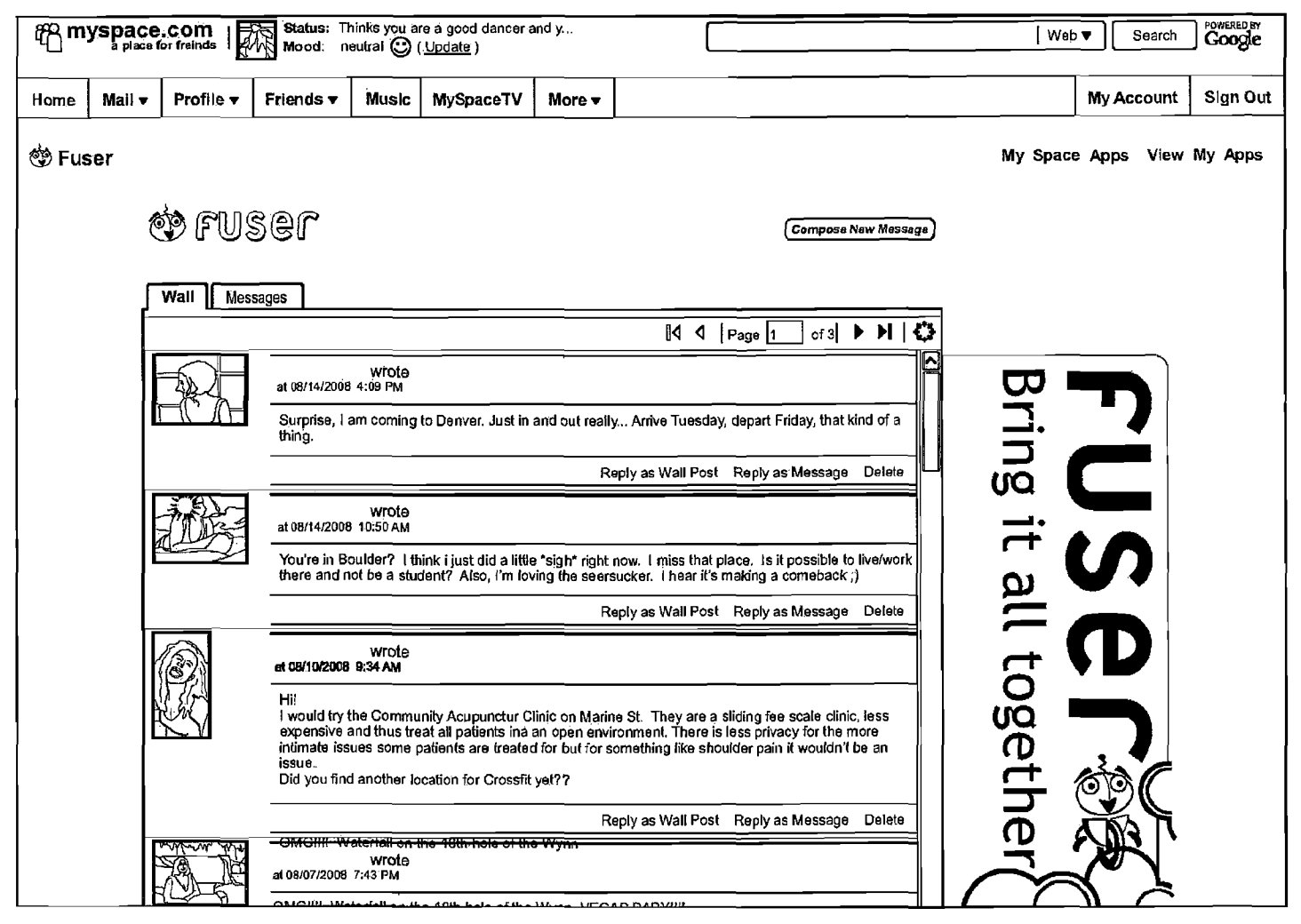

FIG. 26 illustrates an embodiment, with particular regard to a MySpaceApp shot, depicting Fuser running on the MySpace platform.

IV. MODES

Figure 1:
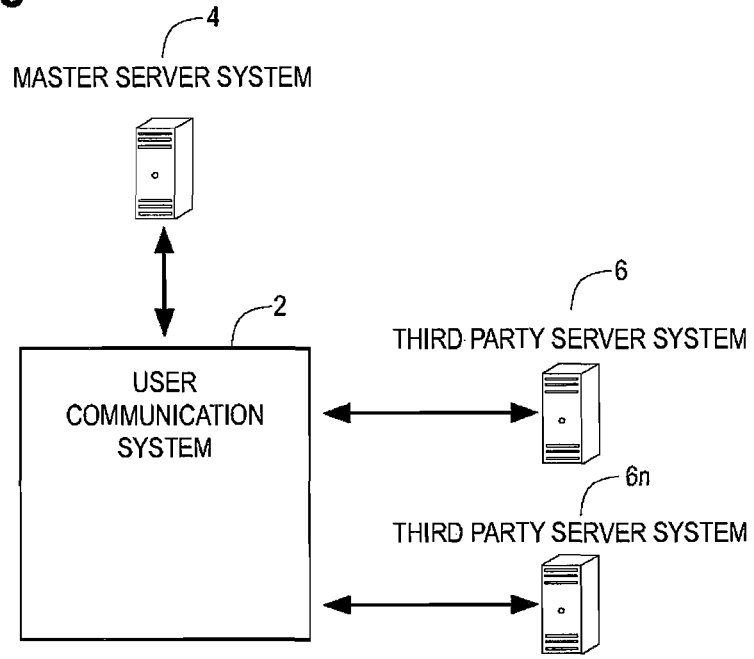
FIG. 1 illustrates an embodiment, with particular regard to architecture.

To orient the reader, consider a system in which one or more computer systems facilitate aggregating user content or data from third party service providers. The aggregating can be carried out "live" (while on line) and can handle real-time and/or peer-to-peer communications by means of communicating over at least one network such as the Internet. The aggregating allows users to more efficiently access their other personal sites to obtain their emails and other information and services provided to the users by third party service providers. Preferably users can also dynamically manage the information obtained from the third party service providers too.

Depending on the implementation preferred, aggregation may occur on the "client" or "server" side. For example, there can be a master server system that can use a log-in engine to log the users into the third party service providers' computer systems. The log-in engine can operate either locally (on each user computer (e.g., "a client side embodiment")) or remotely from the user computers, from the master server system (e.g., "a server side embodiment). That is, depending on the implementation preferred, aggregating can be carried out on the client side or on the server side (or both), and in all cases the log-in engine acquires and stores whatever is necessary for the user to log-in to at least one third party system.

Third party systems or sites (such as AOL, Match.com) typically are accessible to their users by means of user log-in and/or authentication information. Though embodiments herein are not limited to Internet sites, one can get an illustrative sense with reference to users each having a username and a password for each of their third party system sites, such as a web-based email site, personal networking site, job search site, news site, shopping site, and/or commerce site.

Also, some embodiments can utilize a button or link for selective logging in to third party server systems, e.g., separate buttons or links to login to the user's AOL, yahoo, etc. accounts. Clicking on a button or link would cause the user computer 2 to go to the site and sign in automatically. This permits the user to go immediately to the page with content of interest, e.g., user messages, home page, etc. The one button login embodiment improves over having to remember your ID's and passwords and web addresses, but automated log-in carried out via the log-in engine may be even more efficient.

After acquiring, from a user, whatever is needed to facilitate the user's log-in to each of their third party systems, the log-in engine can use the acquired information to automatically log the user computer system into each of their third party systems. This permits pulling down the user-accessible data from multiple sites and aggregating of it—preferably automatically, live and in real time, and essentially simultaneously from multiple sites. So, for example, a user can, in real time, access their email from their numerous email accounts in one email box.

After pulling down the data (email/job posting/news article/product listing—really any user data from multiple sites), the data is presented at the user computer system. The data preferably presented in one common format, for the convenience of the user. For example, this data can be parsed and translated into a common format, and a user interface can present the data (information or content) in a suitable (preferably customizable) manner.

With regard to an illustrative master server system, there can be an Internet or web site that acquires the above-mentioned user log-in information, as indicated above. The site can, but need not, also provide its own particular service(s) (such as email or social networking or job search or news articles or shopping functionality, as indicated below) in addition to facilitating aggregation of user-owned or accessible content and functionality from other sites. That is to say, in this example, the master server system can provide a means for users to (more efficiently) access user data from the master server system and from their other personal Internet sites (and/or other third party systems).

Depending on the embodiment of interest for a particular application, the master server system website can facilitate integration of any or all of a user's email, social networking websites, job search websites, news websites, shopping websites, Internet TV websites, and other network "accounts" into a single, unified setting. The user is enabled to dynamically view contents and information from any of his or her user-preferred sites at the same time. Preferably the user is also enabled to dynamically manage his or her contents and information too.

The master server system website can be coded in any number of ways, depending on the implementation preferred for one application or another. For example, the web site can be coded to do multiple things at one time instead of waiting for each task or component to complete before continuing on. This can be achieved, illustratively, with the AJAX protocol, which allows for asynchronous code execution. Also, a data base can house the users' information, including for example: unified site login (encrypted with MD5—Rijndael encryption can be used for email service passwords) and also other site login information. This data base can be through SQL (e.g., SQL 2005), Oracle, or the like. The coding language can be at least one, and even a combination of PHP, HTML, JAVA, and various other languages as needed. Interfaced to the web site can be an application server, a .NET applications server, JBOSS, or the like. While the implementation for the underlying functionality of any particular web service may be proprietary, the master server system focuses on getting a screen full of html data (and/or other types of data, such as RSS, and/or non-textual content, such as images) and massaging the textual content of the html page to get the desired output on the master server system web site.

The aggregator can facilitate printing (e.g, with a print button) any open communication, e.g., email, Facebook message Wall Post, or MySpace, message, Comment, Bulletin, etc.

The aggregator can also support one or more browsers, e.g., Internet Explorer, Firefox, Safari, and can also support browsers on different operating systems.

Note that a user is, of course, also allowed to delete their account with, or an account on a third party service, via the aggregator.

Consider the handling of some illustrative third party server system resources.

Email Component.

The email component of the master server system can allow the user to integrate their most commonly used emails into one location. In a sense, the site can enable accessing each email account, retrieving a list of messages from that account, combining that list with lists from other sites, and displaying this information to the user. The user is thus able to read, view folders and folder content, "unread," and draft emails from all/to accounts—preferably on a single screen. Additionally, each message can display what account it is from, both in words and in color. For example, if the user received an email from hotmail, the message can be presented to say "Hotmail" whereas an email from Gmail might say "Gmail", e.g., in a different color. The user also has the ability to forward messages that are not natively email (MySpace Mail, Facebook Messages) to an email address. When composing a message the user is enabled to send the message from multiple accounts as well as send the same message to multiple accounts. This allows the user to send the same email text to n number of people from different addresses. The user has the ability to add a signature, such as a digital signature, from any of their email accounts to an email they compose in. For example, if the user composes an email from their Hotmail email, the user can add on a signature saved through Hotmail or another signature saved through Yahoo!. The user can also add and save a new signature to any of their emails.

The aggregated email account checks for unwanted messages (SPAM). The aggregated SPAM check can also check all messages in the account, even if the user has a SPAM checker on a single account. The secondary SPAM check is run on the server-side. The aggregated SPAM check checks a list of common SPAM attributes as well as a list of current attributes. This provides a means to automatically apply GPL blacklists (e.g., Orbs, SPEWS, etc). Aggregating across all of the services can bring consistency to an average user's antispam solution and can permit people to apply a SPAM setting on a service to service basis, not just an all on, or all off.

Examples of email accounts that can be supported include: Hotmail; Gmail; university accounts; Yahoo Mail; MSN Mail; Excite Mail; Mail.com; MySpace; AOL; Comcast etc. The following abilities are examples of what can be provided to users (noting that if any of the sites is not available, then the system site can reflect the unavailability): Search; Compose; Sort Into Folders; Create/Delete Folder; Format Text; etc. If such an implementation be preferred in one application or another, the user can choose to forward an email to a mobile device. This can be carried out by sending the email to a phone number via Short Message Service (SMS). The user can shorten and edit the email to fit into the constraints of text messaging. The user can choose to convert an email to an image and forward this to a cell phone via Multimedia Messaging Services (MMS). By using MMS, emails can be read on a cell phone photo viewer. The user is enabled to add special text formatting and audio effect to send their email to a mobile device with Enhanced Messaging Services (EMS). Note that in addition to such email services as mentioned above, email services can also include sites running specific web based software, such as SquirrelMail or Microsoft Exchange, and embodiments according hereto can be configured to read web content off of SquirrelMail, etc.

The aggregator can also enable receiving an email sent to one email address and selecting any of the user's email addresses to reply from. The aggregator can also provide automatic email address or name completion. That is, when a user begins inputting an email address or associated name, the aggregator can complete the address or name by using a list or lists of contacts imported from the aggregated accounts, or used previously by the user inside the aggregator.

Depending on the implementation desired, advertising can be appended to an email communication. The advertising can be carried out with a text message that includes a URL or other link.

Further, the Email Component can support one or more protocols, such as secure IMAP, secure POP3, and secure SMTP.

Dynamically Discovering Email Service Type and Configuration Using Limited User Input.

In an application allowing users to send and receive email through $3^{rd}$ party email services, one approach can utilize a user's initial setup to determine the type, credentials, and ancillary configuration parameters for his/her email service(s) in order to allow connectivity. This initial configuration process can be made as automatic as possible to minimize the amount of detailed data which the user must provide. Many users, for example, do not know the host name of their POP3 server or possibly even that they are using a POP3 server for email, but they typically do know their email address and the password for the service. By allowing for the discovery of the remaining configuration details taking only the user's email address and password as inputs, a superior user experience can be achieved.

Social Networking Component.

The system can, if so desired, allow a user to have an account at a plurality of different social networking sites, and view the information that is contained within them all from a single location. Optionally, a user can identify what of the information can (or is desired by the user to) be aggregated. In one illustrative implementation, the user can access a site directly to change their individual options and other site-specific data. Social networking sites can include MySpace.com, Yahoo Groups, etc.; blogs can include Yahoo, MySpace.com, etc.

The social networking component of the website can do any or all of the following: retrieve a friend's list from each site; retrieve photos/messages/announcements, etc from each site; if a friend has listed an AIM/Yahoo Messenger/MSN Messenger, etc, screen name, the user can be able to directly IM that person even if the social site that are at does not support this feature; message other members of the same site (each site can support this separately); search for and find other members of that site; view not only their personal blog/journal, but also their friends (protected and private entries can be included assuming the username supplied to the unified site has access to these entries); post entries/updates to each site as supported; etc. Examples of supported websites include: MySpace; Facebook; Bebo; LiveJournal; Dead Journal; Xanga; Blogger; Tagger; etc.

Aggregated Folder Handling in Email.

The system can unify email folders from individual email providers into a consolidated, single view. The definition of the master, merged folder structure can exist on the central site. Standard folders such as Inbox, Sent Items, Trash, Spam and Drafts can be rendered to the user, and emails from the underlying providers that exist in these standard folders can be consolidated into a single, master folder. The system can merge the folders of the same functional purpose with different naming conventions; for example 'Trash' and 'Junk' folders on one provider can be merged with 'Recycle Bin' and 'Spam' folders of another provider. Custom created folders that the user created on the underlying services can also be rendered on the master server system and contain any existing messages the user had placed in those folders.

The user can empty the trash at the aggregator and the aggregator computer system will cause the messages at the aggregated services to be permanently deleted, where such services have trash. If there is no trash feature on a service, in another aspect, the aggregator system can make the "trash" disappear and mark the "trash" so that the underlying service will make it expire.

The aggregator system can also toggle the "read" and "unread" email indicators.

Also, Facebook and MySpace provide a communication venue analogous to email, but limited to other users of the services; these "messages" can also be aggregated into one inbox provided by an embodiment herein. This can be the same inbox that aggregates regular email.

Yet further, there are other communication avenues provided by Facebook and MySpace, e.g., Wall Posts, i.e., comments left by one user on another user's profile. MySpace has a similar feature called "Comments." These can also be aggregated, e.g., into the inbox along with the email, depending on the embodiment preferred. Depending on the implementation preferred, the aggregator can enable a user to take action, e.g., respond to a requested action from the service.

Further, Myspace has a broadcast called a "Bulletin" that can, for example, be brought into the inbox, depending on the embodiment preferred. Generalizing a bit, the aggregator can aggregate any of the communication venues, such as a "Friend Request", a "Group Invite", and "Invite to an Event", and Facebook's equivalents (e.g., to Bulletin). As above, depending on the implementation preferred, the aggregator can enable a user to take action, e.g., respond to a requested action from the service. Depending on the implementation preferred, profile pictures from a social network, e.g., MySpace or Facebook, can be displayed when a user views one of the social network communications, messages, wall posts, bulletins, comments, etc. If the user "hovers" (i.e., with the cursor) over the sender's picture, a preview of the sender's profile information can be displayed. If the user clicks on the picture, a link is used to open a new browser window and display the URL to the sender's profile on the social network.

A facility for mapping folders from the underlying services to one another allows the user to define a centralized folder structure on the master server system. The definition of the mappings can persist on the master server system and allow the user to merge folders from different services, create new folders, extend the depth of the hierarchy and nest folders within one another. For example, a user could create a folder called 'Work' in which they could merge folders from underlying providers called 'Professional' and 'Job'. The user can move emails from the inbox to any of the folders as well as move emails from one folder to another.

Figure 4:
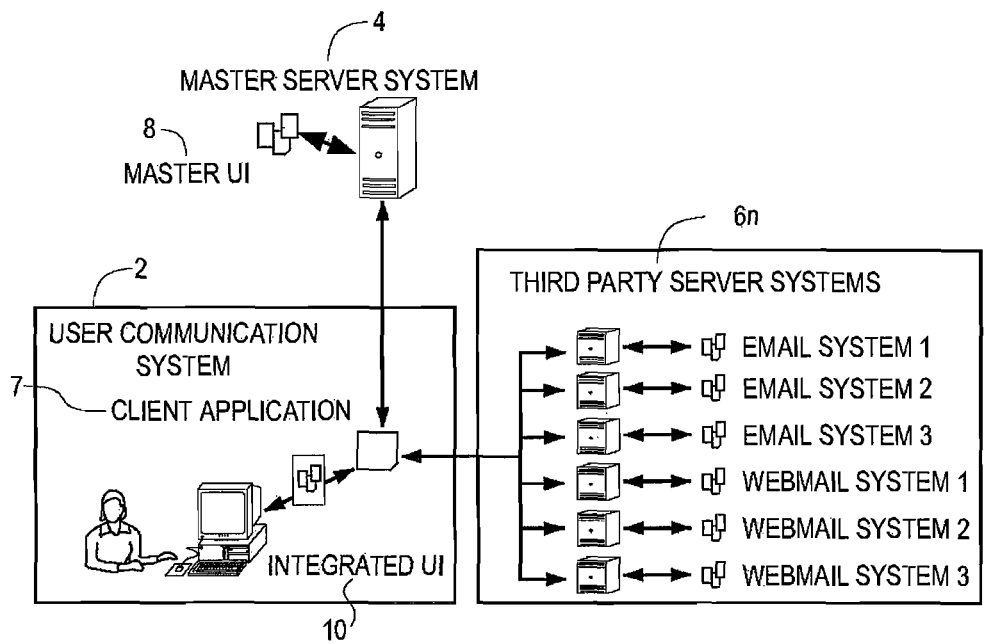
FIG. 4 illustrates an embodiment, with particular regard to architecture.

Capability can be provided for synchronizing the centralized folder structure and contents with the folder structure and contents of the applicable aggregated services (element 6n, FIG. 4). The master server system (element 4, FIG. 4) and client application (element 7, FIG. 4) can execute the creation of folders as needed on the underlying services (6n), as well as move messages on the underlying service to match the organizational schema implemented by the user of the user communication system (element 2, FIG. 4). For example, an underlying folder can be named 'Jobs' from Email System 1 and can be rendered along with its contents in the user communication system. An email displayed in the user communication system, having as a source Email System 2, can be moved to the 'Jobs' folder, resulting in an aggregated display of Email System 1's 'Jobs' contents with the email from Email System 2 in the user communication system. As a result of this action, the client application creates a 'Jobs' folder at Email System 2 and moves the subject email to the new folder, leaving a folder structure and contents that are synchronized with the folder structure and content residing on the master server system and displayed in the user communication system.

Job Search Component.

This component of the master server system can allow the user to integrate job listings from various job boards/job search websites. In a sense, the site can remotely access each job board, retrieve a list of job postings from that website, combine that list with lists from other sites, and display this information to the user. The user can be enabled to read job postings and apply for the jobs from/to all accounts—preferably on a single screen. Additionally, each message can display what account it is from both in words and/or in color. For example, if the job posting was received from Monster then it might say "Monster" whereas a job posting from Dice might say "Dice" in a different color. If a user does not have an account on one of the websites s/he can still browse through the job postings on that website but might not be able to apply for that job through that website.

Examples of job boards that can be supported include: Monster; Dice; CareerBuilder; HotJobs; Jobing; Craigslist; etc. The following aggregation abilities are examples of what can be provided to users: search; saved searches or "agents"; sort the postings; apply for jobs; etc.

With further regard to allowing a user to browse through job postings on several job boards sites like monster.com, dice.com etc., the system can aggregate the results from several sites and show the user aggregated results. The system can use the username and password of the user to log onto his/her account and get the results. The user can also apply for the jobs by clicking a link on the third party server's website if the user has an account with the job board where the posting was listed. The user can browse through postings on various job search websites. Representative steps to implement a Job Search component can include: user logs in to the master server system's website and goes to job search page on the master server's website; user enters the search query and selects various parameters like job location, full-time/part-time/contractor job etc and hits on "Search"; LOGIN—the master server system can log in to each of the user's accounts (job boards); RETRIEVE—the master server system can retrieve the results of the search query from each of the user's accounts; PARSE—the master server system can parse the retrieved html page and store the pertinent data in java objects; AGGREGATION—the master server system can aggregate the results from each of the user's accounts; DISPLAY—the master server system can display the aggregated results to the user; APPLY—the master server system can let the user apply for the job if user clicks on Apply without taking the user to the respective job site; etc. Depending on the embodiment preferred, a job search can be carried out on the client side, the server side, or both.

Shopping Component.

This component of the master server system can allow the user to integrate product listings from various shopping websites. Depending on the particular embodiment preferred, the master server system can enable the user computers to aggregate, or in another embodiment, the master server system can enable server-side obtaining of shopping (or other) information and relay the information to the users via the web site. Such an implementation is preferably carried out such that the user can retrieve a list of products from that website, combine that list with lists from other sites, and display all of this information. The user can be enabled to read about products and buy the products from/to all accounts—preferably on a single screen. Additionally, each message can display what account it is from both in words and, if desired, in color. For example, if the product listing was received from Amazon then it might say "Amazon" whereas a product listing from eBay might say "eBay" in a different color. If a user does not have an account on one of the shopping websites s/he can still browse through the products listing on that website but might not be able to buy that product through that website.

Examples of shopping websites that can be supported include: Amazon.com; eBay.com; Overstock.com; Buy.com; Mercantila.com; Newegg.com; etc. The following aggregation abilities are examples of what can be provided to users: Search; Saved Searches; Compare prices; Read reviews; View Ratings; Buy the product; etc.

With further regard to allowing a user to shop on various shopping websites through a single webpage, a user can be allowed to compare the prices and reviews of an item on different sites like Amazon.com, Buy.com, target.com, Overstock.com etc. Additionally user can be allowed to buy items at the aggregated site. The master server system can provide functionality where user can add all the websites s/he is interested in buying from. Illustrative steps to implement the shopping component can be: User logs in to master server system's website and goes to shopping page on master server system's website; User enters the search query for products and hits on Search; LOGIN—master server system can log in to each of the user's accounts (shopping sites); RETRIEVE—master server system can retrieve the results of the search query from each of the user's accounts; PARSE—master server system can parse the retrieved html page and store the pertinent data in java objects; AGGREGATION—master server system can aggregate the results from each of the user's accounts; DISPLAY—master server system can display the aggregated results to the user; BUY—master server system can let the user buy the product if user clicks on Buy from master server system account itself. User won't be redirected to the respective shopping website. Depending on the embodiment preferred, Shopping can be carried out on the client side, the server side, or both.

NEWS Component.

This component of the master server system can allow the user to integrate the news listings from various news websites. In a sense, the site can remotely access each news site, retrieve a list of news from that website, combine that list with lists from other sites, and display this information to the user. The user can be enabled to read the news from all accounts—preferably on a single screen. Additionally, each message can display what account it is from both in words and, if so desired, in color. For example, if the news listing was received from CNN then it might say "CNN" whereas news listing from Reuters might say "Reuters" in a different color. If a user does not have an account on one of the news websites s/he can still browse through the free news listings on that website but he might not have access to the premium content on that website.

Examples of news sites that can be supported include: cnn.com; reuters.com; msnbc.com; Google news; Yahoo news; Nytimes.com; etc. The following abilities are examples of what can be provided to users: Read news; Aggregate news based on category (sports/politics/travel/entertainment etc); Aggregate news based on news source (cnn/reuters/nytimes etc) or Blog entries; Aggregate news from Blogs; Ability to rank the credibility of the source or quality of the content; Filtered views or ranked results based on user preferences or aggregate user rankings for credibility of source or quality of content. With further regard to allowing a user to view news from various websites on a single site or page, a user can aggregate the results based on news source and/or news category. The user can be allowed to add news websites. The master server system can get the news in the different categories from the websites s/he has added. Representative steps to implement NEWS component can be: User logs in to the master server system website and goes to news page on the master server system's website; LOGIN—master server system can log in to each of the user's accounts (news websites); RETRIEVE—master server system can retrieve the results from each of the user's accounts; PARSE—master server system can parse the retrieved html page and store the pertinent data in java objects; AGGREGATION—master server system can aggregate the results from each of the user's accounts; DISPLAY—master server system can display the aggregated results to the user; etc. Again, as with any of the embodiments discussed herein, depending on the embodiment preferred, News can be carried out on the client side, the server side, or both.

Instant Messaging Component.

This component allows users to aggregate the authentication and usage of disparate Instant Messaging accounts. The user can authenticate, send, and receive instant messages, send and receive files, and initiate or receive voice calls from any of their Instant Messaging services via a single login and interface. Capabilities of aggregated Instant Messaging can also include: view buddy lists and online status of buddies form all accounts; use the IP address to overlay voice or file transfer capabilities to a IM account that did not have those capabilities; initiate ad hoc IM, file transfer or voice sessions based on the users IP address whereby the account identifier was masked for each participant; overlay a Peer-to-Peer (p2p) file transfer protocol; store content on their local machines and define access rights for other users in the P2p file sharing mechanism; alert a user when the online status of a buddy had changed on any account; add the IM service to the aggregated Social Networking features; merge IM buddy lists with email and social network contacts; link a IM Voice call to a land line or cell phone.

Internet TV Component.

The Internet TV component of the master server system enables the user to aggregate streaming Internet TV listings from various websites and enables access to the streaming Internet TV broadcasts of interest to the user. There are now over 3,500 streaming TV stations accessible via the Internet from around the world. At initial setup of this component, the user can store his/her TV preference to Internet TV sites and preferences such as languages, country of origin of the station, types of programming, etc. in the master server system. When activated by the user, the system aggregates and displays listings of preferred Internet TV stations and selected contents of interest to the user. Upon selection by the user, the master server system then enables the connection to the station for viewing the program.

Value Adding Services Component.

In some embodiments, such a component can establish a centralized and unified application execution layer in order to process logic or functionality uniformly across the aggregated content or data prior to rendering to the user. Similarly, this component allows for a logical or functional application to be applied to user-generated content or data prior to it posting back through an underlying, third party system. Functionality that can be added to this component can include: Centralized or secondary Virus Scanning; Centralized or secondary Spell Checking; Centralized or secondary Spam Checking in order to both catch unwanted messages as well as catch messages that had been misclassified as Spam by the underlying service; Centralized execution of user defined rules based on the message context in order to file messages in predefined folders—delete, forward or classify the message—or initiate an alert process such as sending an SMS or voicemail message to the recipient or sender; Centralized execution of system rules based on the message context in order to alter the content of a message, for the purpose of promoting features or advertising services; Centralized search of aggregated message content (from email, social network, or other message service provider), allowing a user to search for keywords or phrases in message headers (sender, subject, date) or message bodies across multiple underlying services from a single search interface; Threading and displaying message conversations (as implemented in Google's Gmail product) for messages whose source underlying service does not natively thread conversations; Re-send as an email a message that is not natively an email (for example, a message created as a Wall Post on Facebook could be sent to an email contact); Automatically generated list of elements or contacts that were recently accessed by user where list would allow expedited opening or display of the selected element or contact.

Status Aggregation Component

This component of the website aggregates and displays social status messages from other web sites. These status messages are typically short and may contain URLs linking to additional web-based content. They may be automatically generated by the underlying site due to an action taken at the site (for example a vote in an online survey) or they may contain content generated by a user of the site (for example a message created on Twitter). This component displays an aggregated stream of status messages for a selected contact or group of contacts, where the status messages are retrieved from multiple underlying sites at which the contact maintains an account.

Contact Communications Focus Component

This component of the website aggregates and displays all communications of a contact or group of contacts selected by the user. The communications that are presented by this component are sourced from all third party server systems aggregated by the product. For example, a selected contact may use two different email addresses, a social networking account and social status messages on two other web sites. This component would render an aggregated view of communications for the given contact from all five sources, allowing a user to view the entirety of communication data from the contact. Additionally, this component facilitates the publishing of this aggregated content through RSS or another syndication scheme, allowing the user to monitor content updates using an RSS feed reader or other syndication client.

Activity Scoring Component

This component of the website automatically generates a numeric score that represents a user's level of communication activity. This score can be based on data generated by each of the services aggregated in the product including, but not limited to, the rate that messages are received, the rate that messages are sent, the total messages received, the total number of friends listed at each service, or any combination thereof. This score can be presented to the user in a number of ways throughout the product and used as a symbol of a user's status within the product. Incentives may be offered for increasing this activity score by set amounts, such as awards, credits, or some form of consideration (e.g., monetary consideration). This component can also generate a second score based on each individual service's activity rate, allowing each aggregated service to be ranked based on its individual contribution to activity, or viewed another way, as an indicator of respective usage of the services. Additionally, this component can facilitate the display of activity scores through a web-based badge or "widget" that can be published on a third-party website (such as a blog or social network profile page) such that the score can be automatically updated in the published page.

Public Aggregation Component.

This component of the website can allow the user to create a publicly available page that aggregates content of their choosing. For example, the user can have their MySpace blog, Flickr pictures, News from the BBC and FaceBook 'The Wall' accessible to the public through a provided web address such as http://www(dot)oursite.com/username. The user can be enabled to login and update content on this page through our interface. For example, the user can add a blog entry to their LiveJournal Blog, respond to a comment on a picture they have on Flickr, update a resume on a job search site and change a highlighted news story. The user can be enabled to publicly aggregate blogs they write. The user can edit their publicly aggregated blog to publish back content to each individual blog they manage. The user can be enabled to publicly aggregate blogs. The user is enabled to have their blog publicly aggregate with other blogs. The user can define accessibility rules in order to password protect some or all of their aggregated content.

Consider now illustrative software, e.g., Java, elements, any of which can be included depending on the implementation preferred:

Controller.

This interface defines functionality for retrieving, downloading html content from a specific web URL (Uniform Resource Locator), i.e., from a web address. The following initial retrievers can be defined in the system: Yahoo Mail, Folders; MSN Mail, Folders; Gmail Mail, Folders; MySpace Mail, Folders; etc. The following email functionality can be made common across all retrievers—define and implement service specific functionality as follows: Login—user login and logout; Get Folder List—retrieve the names of email folders; Get Email Contacts—get list of email contacts; Get Messages from Folder—get an html page full of messages; Get Next Folder—get Messages for next folder; Get Previous Folder—get Messages for previous folder; Get Message—get message body of a single message; Mark Message Read; Mark Message as Unread; Move Message; Delete Message; Spam Message (e.g., "IS THIS SPAM?"); Purge Message; Empty Trash Folder; Search Message—performs message search, returns a list of messages that match the given search criteria; Send Message; etc. Implementation of functionality for the above mentioned interfaces also can affect the specific service being used. For example, a Yahoo message deleted on the master server system web site can ultimately also delete the message from the underlying Yahoo service. Similarly, an MSN message marked "unread" on master server system web site can also cause the message to be marked unread on MSN.

For job search and shopping components, the master server system can retrieve the appropriate pages based on search query from all user accounts. For news components, the master server system can retrieve the appropriate pages based on category and/or source from all user accounts.

For any of the content retrieved, the master server system can "read ahead" and retrieve and cache content in local memory based on anticipated request for retrieval to reduce the time between request and content rendering.

Content Parser.

This component parses specific html content retrieved by the controller into various meaningful pieces of information or tokens. Tokens can be stuffed into a Java object collection. Each object can also be called a Value Object—a simple, lightweight Java object that holds one piece of information—for example, a user's email message. A collection constitutes one or more email messages for a given user. The following content parsers can be specified as part of the master server system software: Email—one email parser each for Yahoo, MSN, Gmail, MySpace.com, and SquirrelMail—parse Email from html retrieved from the above mentioned providers for a particular user; Blogs; Forums; Social Networking; Job Search; News; Shopping; Internet TV; etc. The following parsing functionality interfaces can be common across various providers, though their implementation can be as desired for one embodiment or another: Parser Folder—Parse the contents of folder on an html page, extracting messages within it—individual message fields are parsed in order to retrieve message attributes; Parse Contacts—Parse contacts within an address book on an html page; Parse Folders—Parse folders from an html page; Parse Email Message—Parse email message from within an html page; Parse Job Postings—Parse job posting from within an html page; Parse News Listings—Parse news listings from within an html page; Parse Product Listings—Parse product listings from within an html page; Parse TV Listings; etc.

Parsed Content Aggregator.

This component consolidates, aggregates parsed output, from similar web services from different providers. The following aggregators can be defined: Email—Consolidate and aggregate email from a list of email providers—this list can contain, but is not limited to, MySpace.com, Yahoo.com, Gmail.com, MSN.com, sites hosting SquirrelMail, and other email providers; Social Networking; Blogs; Forums; Job Search; News; Shopping; etc. The master server system facilitates combining output of all web services.

Content Renderer.

This component can be used to render aggregated content, e.g., by interacting with JavaScript to exchange data between the Java applet and the underlying JavaScript. This can be a combination of ASP.NET/HTML pages, where data is formatted server-side, and JavaScript on these pages that retrieves data from a client-side application piece (herein exemplified as an applet, but consider also Flash or Silverlight, etc.) and merges the data into the browser page's Document Object Model (DOM).

Platform-Independent Embodiment.

The embodiments herein can be implemented on third party platforms or web services. A page is created inside the third party web site to implant the aggregation. Such an embodiment can be carried out by a system in which a computer program directs scraping of data from a web page accessible at the address at issue and presenting, within the framework or platform of a third-party web service, a page populated with the scraped data.

Authentication, Cookie Management.

To communicate with the master server system, a user can authenticate an identity, e.g., by using a designated email address and password. This information can be stored in a data base. Depending on user's preference, a master server system cookie can be saved on user's hard disk. If user chooses to allow the saving of the cookie, it can be used to authenticate in lieu of user using a login and password. Authentication information can be used to retrieve user preferences from the master server system's data base including Email sites, Social Networking sites, Blog sites, job boards, news sites, shopping sites and forum subscriptions, on subsequent logins. The master server system could also enable detection of the presence of cookies used by known third party systems in order to prompt the user to add the service, or ease the process of adding that service.

Provider Applet.

To render email aggregated from multiple sites, in one embodiment, the master server system could access Yahoo, MSN, Gmail, MySpace and other web service sites. This can be done by retrieving URL content from the server side to access the above-mentioned illustrative sites. However, it is conceivable that these businesses could block such access, e.g., by blocking the master server system's finite IP addresses—potentially crippling or shutting down the aggregation (i.e., a server side embodiment requests would originate on a single or limited server side IPs). To address the blocking of IP issue, in another embodiment, the master server system can have a signed applet which would automatically be downloaded to the user computer system. The applet would serve as a "proxy" between the master server system's users and the third party service provider, e.g., Yahoo, MSN, Gmail, etc. Requests originating on the applet side would contain the IP address of the end user (providers would not block an end-user IP address).

Please understand that the foregoing is offered to help orient the reader and is not intended to be the sole implementation. Aggregation can encompass digital television, cellular communications, and on-line games systems, etc. Even in a web implementation, there can be many variations, depending on preference. Indeed, the master server system can facilitate the ability to integrate, aggregate, and consolidate homogeneous or heterogeneous services of various third party service providers. As mentioned above, web-based services can include, but are not limited to, email services, social networking services, blogs, forums, chats, chat rooms, job search services, news services, Internet TV services, Instant Messaging, File Sharing, VoIP and shopping services—preferably via user-enabled content management rather than by any proprietary presentation service.

To illustrate this point, consider one way of handling personal networking functionality in a use case where users are allowed to aggregate and reformat their public profile data from multiple sites. One embodiment can allow a user to choose bits and pieces from their various social networking profiles (e.g., on MySpace, Facebook, etc.) and reformat them into a single Fuser public profile page. Said more generally, a personal networking site can involve a content provider(s) (e.g., the owner of the content on a personal networking site that is making the content available to a viewer) and a viewer (someone such as a user who desires to see the personal networking information from the content provider). In an embodiment, an aggregator system can allow the content provider to create a template for the display of information from multiple sites. This information can be obtained preferably in real time, e.g., as it is requested by a viewer, and presented to the viewer in the format designated by the content provider.

Turn now to the accompanying drawings, which illustrate embodiments in detail intended to illustrate and exemplify in a teaching and prophetic manner, rather than limit—much like teaching mathematical addition by examples rather than by an explicit compendium of all addition possibilities.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow or "logic means" can be implemented in discrete circuits, programmed computer, or the equivalent. Computer-readable media, as used herein can comprise at least one of a RAM, a ROM, A disk, an ASIC, and a PROM. Industrial or technical applicability is clear from the description, and is also indicated below.

Now turn to FIG. 1, which illustrates a user system 2 able to communicate with master server system 4 and third party server system 6. Note that third party server system 6 is to illustrate that there can be a plurality of third party server systems, and note that the user system 2 can communicate with one or more of the third party server systems 6. Third party server systems 6n can, but need not, communicate among themselves.

User system 2 can comprise a computer (e.g., an IBM, Hewlett Packard, or other personal computer) with one or more processors (e.g., an Intel or AMD series processor or the like), a memory (e.g., a hard drive, disk drive, etc.), an input device (e.g., keyboard, mouse, modem, or the like), and one or more output devices (e.g., a modem, a Hewlett Packard printer, a Dell monitor, or other such output device). Note that the modem is representative of a computer-to-computer communication device that can operate as an input/output device. To provide other illustrative embodiments, the user system 2 can comprise at least one of a desktop computer, a telephonic device, a game console, a laptop computer, and a mobile communication device. The mobile communication device can comprise at least one of a cellular telephone, a telephone that is not cellular, a pda, an (phone-type device. In many cases, the user system 2 can include an operating system (e.g., Microsoft XP Professional, Linux, Unix, etc.) and, or wherein, a program control (i.e., in application form or built into the operating system, etc.) to carry out functionality in accordance with any of the embodiments herein.

A master server system 2 can comprise a computer (e.g., Dell DL-585 server) with one or more processors (e.g., Dell DL-585 servers with Windows 2003 Server) to carry out functionality in accordance with any of the embodiments herein. Master server system 4 can comprise a server computer capable of communication with other computers over a network and the hosting and delivery of web pages, media files, applications or other content. Master server system 4 can, but need not communicate with the third party server systems 6.

A third party server system 6 can comprise a computer (e.g., Dell DL-585 or the like) with one or more processors (e.g., Dell DL-585 is a typical server, Netscalar Load Balancers, Cisco firewalls and switches) to carry out functionality in accordance with any of the embodiments herein. Illustrative of third part server systems 6n are America Online, Yahoo, Google, Microsoft, as well as systems that need not be Internet-based, such as cellular (Cingular, Verizon), cable TV systems such as Comcast, etc.

Communication between master server system 4, user system 2, and third party server system 6 can comprise one or more of packet switched, circuit switched, etc., networks. Communication, illustratively, can occur over a PSTN, Internet, and/or cable network, such as is provided by companies like AT&T/SBC.

Figure 2:
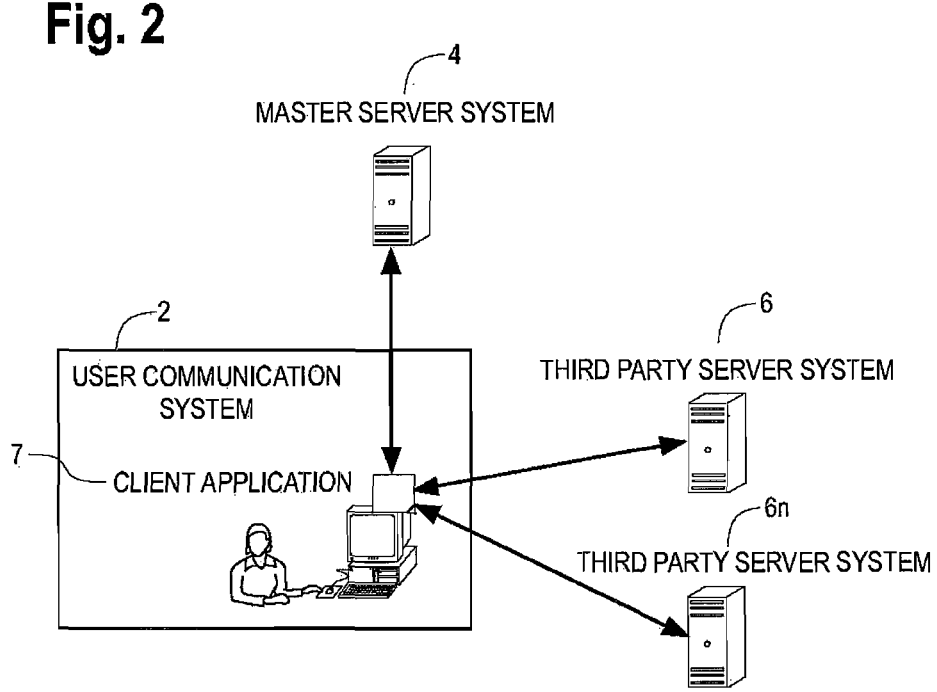
FIG. 2 illustrates an embodiment, with particular regard to architecture.

Consider now, FIG. 2, which illustrates one of the many embodiments included herein. In this embodiment, Master server system 4 delivers Client Application 7 to the User communication system 2. Once delivered, the client application 7 can be installed and persist on the user communication system or it can be delivered during each individual session with the master server system. The client application 7 can be a stand-alone or desktop application designed and written to leverage the operating system on the user system 2. Alternatively, the client application can be designed and written as a module or extension to function within another application already present on the user system 2; for example a Java Applet or Active X component designed to execute in a web browser such as Firefox or Internet Explorer. The client application 7 runs locally on the user system 2 in order to execute functionality. The client application 7 utilizes the underlying communication capabilities (e.g., networking hardware, network drivers, and operating system provided networking API) of the user system 7 in order to communicate with both the master server system 4 and any of third party server systems 6n. The master server system 4 stores persistent information to allow access the third party server systems 6n. This information can include the location of the server and any user authentication credentials required to access any the third party server system 6n. The client application 7 is capable of retrieving this information persistent information (e.g., $3^{rd}$ party server network addresses and user credentials for that service) from the master server 4 in order to directly access the third party server systems, inclusive of any required authentication procedures.

Figure 3:
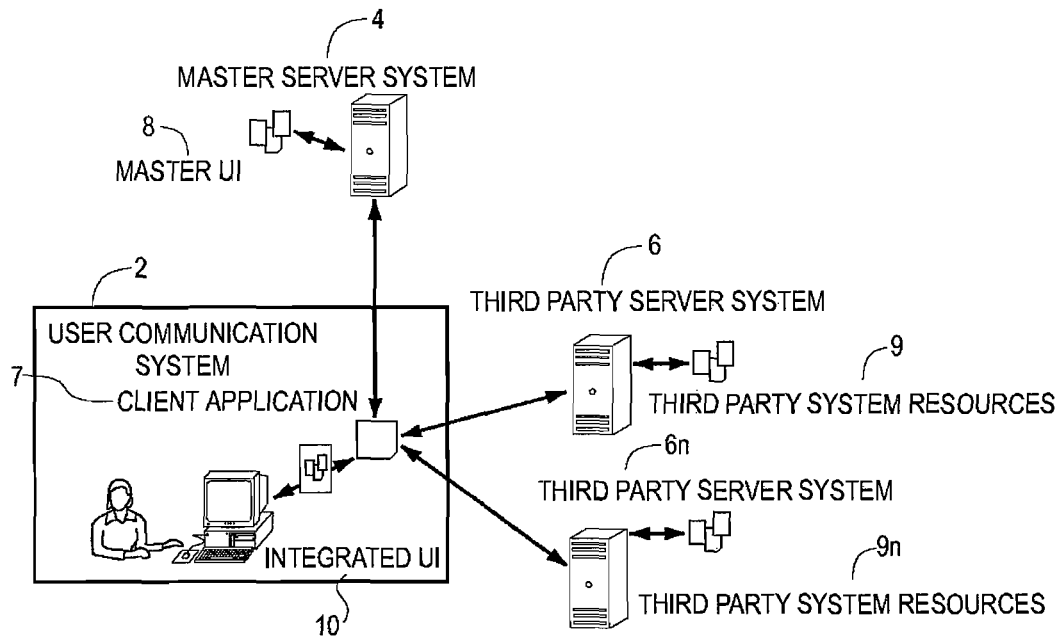
FIG. 3 illustrates an embodiment, with particular regard to architecture.

FIG. 3 further illustrates an embodiment wherein the master server system 4 hosts a master user interface 8. The master user interface 8 can comprise web pages, graphics, forms, logos and other stylistic elements, such as those that produce a uniform branding or look and feel. The master server system 4 can deliver the master user interface 8 to the client application 7. The master server system 4 can also deliver information defining at least one third party system resource 9 residing on the third party server systems 6 required as data objects in the master user interface 8. This information can include the location of a third party system resource on one of the third party server systems 6n, parameters and methods required to access the resource, authenticate and hold a session on the third party system 6n, any necessary logic required to parse or otherwise isolate specific data objects held within the third party system resource 9, etc. For example, the third party system resource 9 can be a web page, XML document, Web service response, RSS feed or other form of web resource wherein only specific elements, fields or information are needed. The client application 7 can retrieve the web page and isolate specific elements, fields or information in order to populate the master user interface. The result is a uniform user interface, assembled by the client application using the master user interface 8 as a template and resources from disparate third party server systems 6n to populate the template. The client application 7 can additionally accept user input from the master user interface 8 and relay that input to any of the third party server systems 6n. This allows the client application 7 to access third party systems resources 9 or functionality which require user input.

FIG. 4 illustrates an embodiment wherein the third party server systems 6n all provide a similar service. Such a service could be email, social networking, instant messaging, photo or video sharing, news provisioning or a number of other services typically found in online systems. In this embodiment, the client application 7 unifies the third party system resources into a single master user interface. This provides a user with a single point of access to a variety of similar accounts or services as well as a uniform experience and set of functionality.

Figure 5:
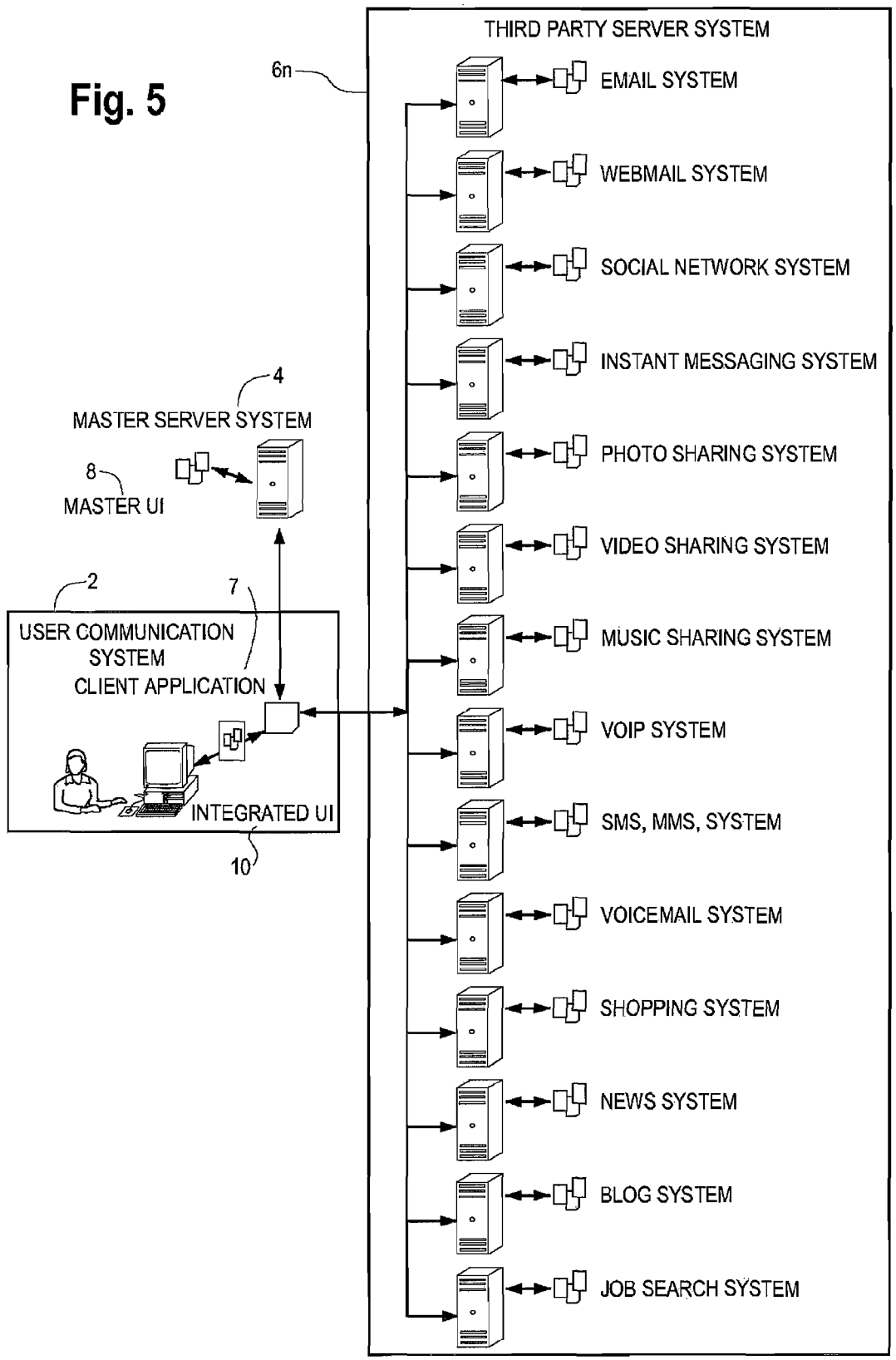
FIG. 5 illustrates an embodiment, with particular regard to architecture.

FIG. 5 illustrates an embodiment wherein the third party server systems 6n each provide separate or unique services. In this kind of embodiment, the client application 7 can unify the third party system resources 9 into a single master user interface 10. This provides a user with a single point of access to a variety of services and functionality.

Figure 6:
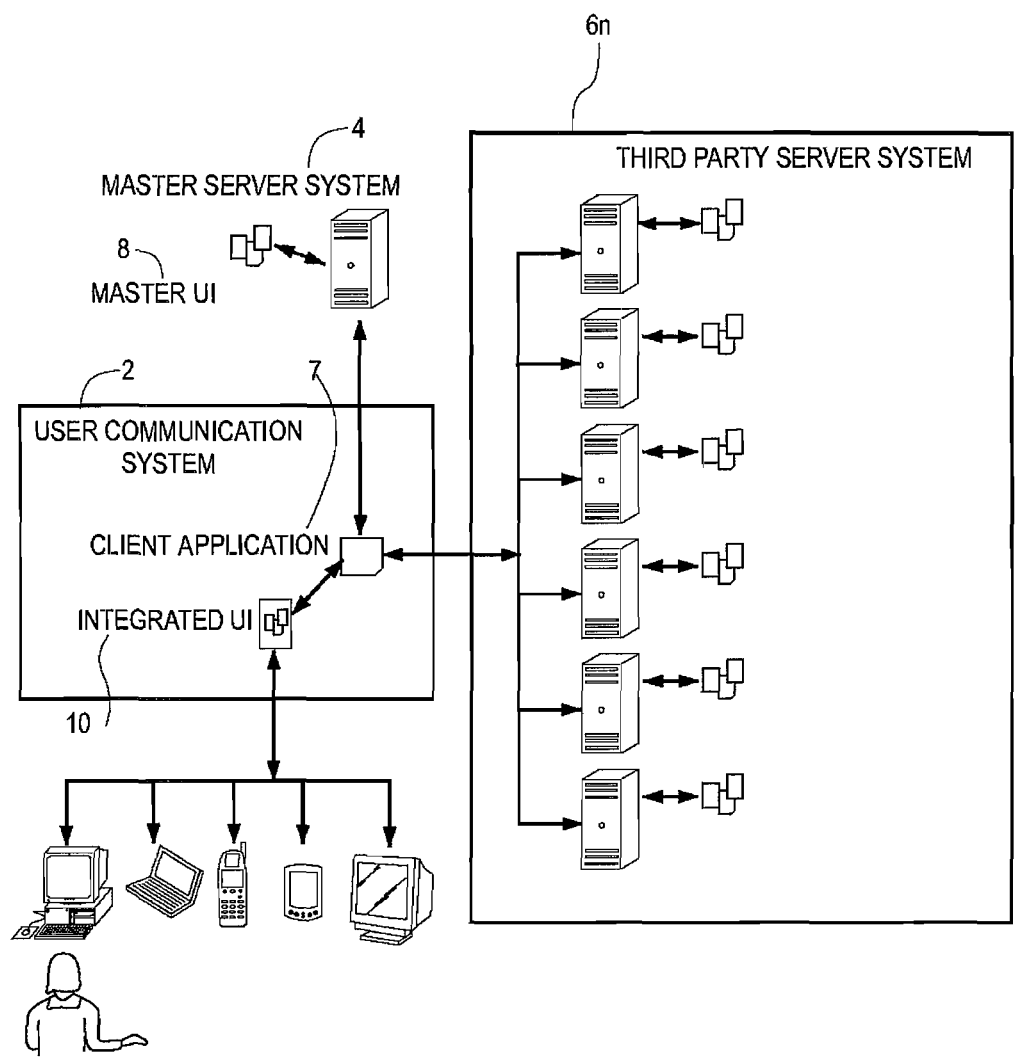
FIG. 6 illustrates an embodiment, with particular regard to architecture.
Figure 7:
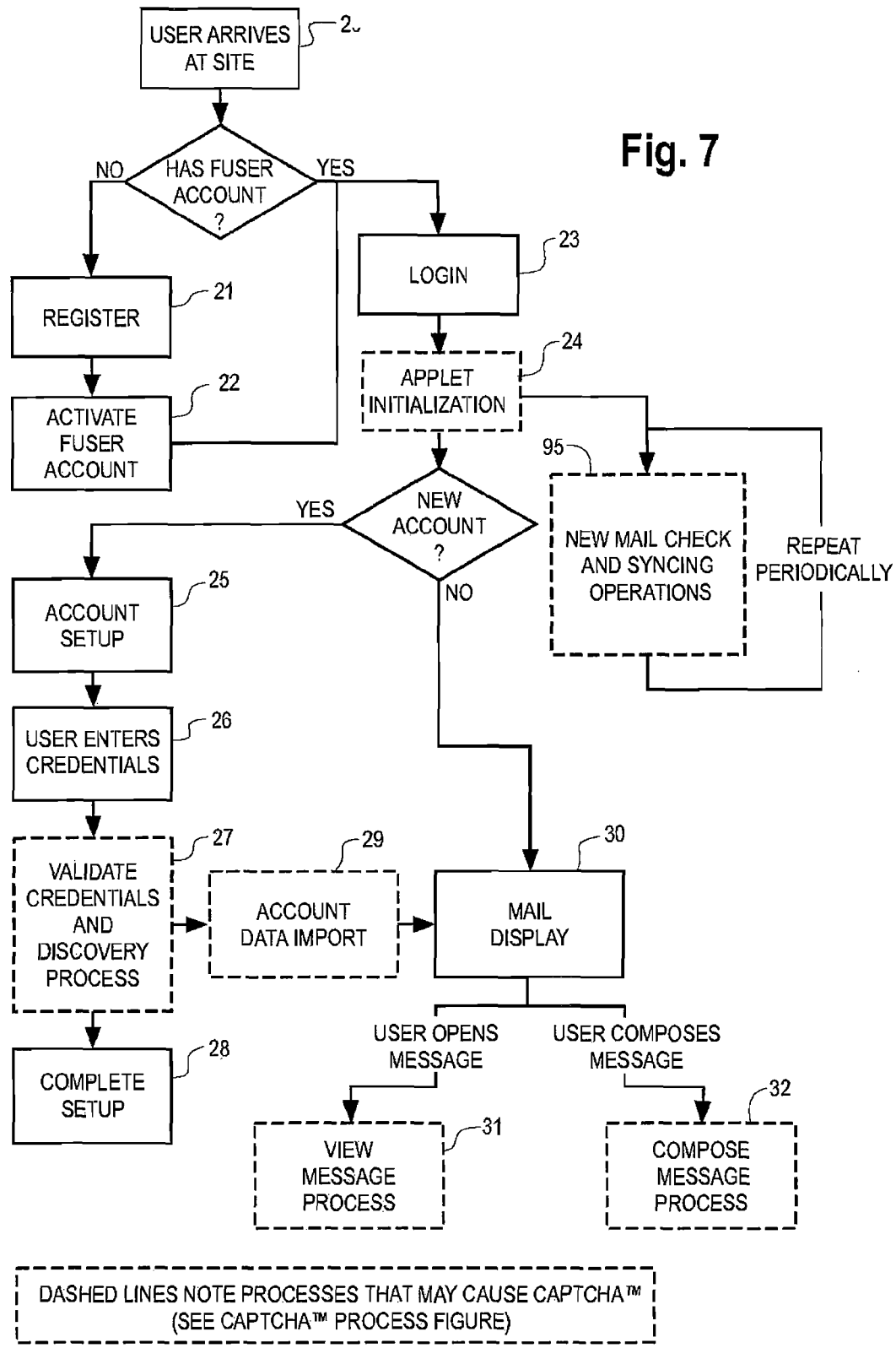
FIG. 7 illustrates an embodiment, with particular regard to a Mail overview.

FIG. 6 illustrates the client application 7 delivered to and executing on a variety of user communication systems 2. The user system 2 can be a personal computer, laptop, personal digital assistant, cellular phone, smart phone, television, set top box or any other device capable of networking and executing compiled software programs.

Turn now to FIGS. 7 through 14, which illustrate an embodiment covering email account aggregation from multiple $3^{rd}$ party email services. By way of a Mail Application Overview and Initial Account Setup Process, begin by considering FIG. 7. At block 20, the user navigates their browser to Fuser(dot) com and opens the registration page over an SSL encrypted tunnel. At block 21, the user registers for a Fuser account by providing a user name, password, and primary email address. Once the registration is completed, at block 22 the user receives his/her activation information via email. Using the activation link in the email, the user activates his/her Fuser account by clicking on the link. At block 23, the user logs into Fuser(dot)com by supplying his/her user name and password. Once authenticated, at block 24 the user is redirected to a web page containing a Java applet, which downloads and runs in the background. Once loaded, the applet requests the user's email account(s) information from the server. If the applet gets email account(s) credentials from the server, i.e. user has $3^{rd}$ party accounts already setup, the applet initializes these accounts for further processing (see Applet Initialization Process below for more detail).

When the user either logs in or tries to register, the aggregator system will determine whether the user's Java version is to a suitable level, and if it is not to a suitable level, then the aggregator system will walk the user through the process of updating the Java version.

At block 25, the user is taken to the add/remove services page to configure his/her $3^{rd}$ party email accounts to be aggregated. At block 26, the user decides to define/setup a service account for aggregation. The user enters the email address and password for the service account. At block 27, JavaScript on the page determines if the service type and ancillary settings can be derived to access needed to access this service, e.g. network address, etc.:

a. If the service type and settings are predefined, jump to c.
  b. Ask the user for the service type. If the service type is insufficient to derive the necessary settings, jump to d.
  c. Try to validate the account by logging into the service via the applet.
    i. If the login attempt is successful, jump to block 28.
  d. Attempt to determine the settings for the service account so the user doesn't have to provide them (see FIG. 8—Discovery Process for more detail).
    i. If required settings are discovered, jump to block 28.
  e. If the additional settings cannot be discovered, prompt the user for more details.
  f. Attempt to validate the account by logging into the service via the applet, using the settings given by the user.
    i. If the login fails, inform user of failure and jump back to b
    ii. If the login succeeds, jump to block 28.

Block 28 stores the account service information on the server in an encrypted format, starts an initial data import thread for the newly added service in the applet, and displays an updated setup page to the user so he/she knows the service was added.

After an account has been added, at block 29 an import process occurs to import the initial data. (See FIG. 10—Initial Account Import Process for more detail.) At block 30, after setting up all of their $3^{rd}$ party accounts, the user can access an aggregated inbox or Mail Display page. (See FIG. 11—Mail Display Process for more detail.) At block 31, users can view message contents from the aggregated inbox. (See FIG. 12—View Message Process for more detail.) At block 32, users can compose new messages or reply or forward existing messages. (See FIG. 12—Compose Message Process for more detail.) At block 33, after the user logs in and the applet is initiated, a background process checks for new mail and synchronizes existing mail runs periodically. (See FIGS. 14 and 15 for more detail.)

Turn now to Email Account Settings Discovery Process (FIG. 8). At block 34, an add/remove service page calls a discovery method on the Applet to attempt to determine the settings needed to successfully connect to and login to the service. The Applet is passed the user-supplied email address and password. If the settings are known based on the email domain, an attempt is made to login to the underlying $3^{rd}$ party service using the email address and password. If successful, jump to 38. At block 35, if the settings are not immediately known or the login failed, the user is prompted to select the service type for that account, (e.g. Exchange, POP, IMAP, etc.). At block 36, the Applet constructs a list of commonly used network address variants for the service type by combining a common subdomain list with the domain for the user's email address. For example, POP accounts will commonly access a server with a pop or mail subdomain, so if the user's email address was xyz@fuser(dot) com, the constructed list would contain addresses like pop(dot)fuser(dot) com or mail(dot)fuser(dot)com. At block 37, the list is looped through, attempting to connect and login to the underlying service at each candidate network address using a known signature for a successful login. If no successful candidates are discovered, jump to 39. At block 38, if a successful candidate is discovered, there is a return of a success indication to the calling webpage along with the candidate settings and stop of further processing. At block 39, if not successful, there is a return of a failure indication.

Consider now a resolution process, e.g., CAPTCHA Resolution Process (FIG. 9). CAPTCHA is a means of determining whether the logon is a human or not, often used to avoid spam bots and the like. At block 40, for any request the Applet makes to an underlying service that can potentially trigger a CAPTCHA, the applet checks for a CAPTCHA indicator by parsing the page looking for specific tags which would indicate that occurrence for the service in question. At block 41, if a CAPTCHA is detected, the Applet stores the currently executing business process state and the CAPTCHA information is parsed and stored, and the business process is suspended. All this data is passed to a new CAPTCHA handling thread. At block 42, the Applet displays a dynamically configured dialog window to the user with the CAPTCHA information and necessary input fields. At block 43, the user fills in the dialog with the information required to answer the CAPTCHA and clicks OK. At block 44, the Applet submits the user supplied answer to the service to clear the CAPTCHA state. At block 45, if the logon is successfully cleared, the suspended business process is restored and executed.

Turn now to Initial Account Data Import (FIG. 10). At block 46, the Applet checks a service account import status and if it is not a new account, exits from this process. At block 47, the Applet imports service account contact data by parsing the contact pages on the underlying service website and calling a server web service with formatted contact data. At block 48, the server web service stores the contact data in a data base. At block 49, the Applet imports a service account email folder structure by parsing the mail pages on the underlying service website and calling a server web service with a list of folders found. At block 50, logic on the server maps certain "default" folders (e.g., Inbox, Trash, etc.) to pre-populated default folders and adds the rest as user-defined folders in the data base. At block 51, the Applet loops through each folder, parses email metadata (e.g., From, Subject, Date Sent, read status, attachments flag) from the underlying $3^{rd}$ party service's website and uploads this email metadata to the server via a SOAP—Simple Object Access Protocol (SOAP) is a common protocol used for web service communications in the industry—web service call. At block 52, the server stores this data to the data base—messages which reside in one of the folders which was "mapped" during the folder import process (see block 50 above) are stored under the appropriate mapped folder in the data base, whereas messages in other folders are simply stored under the corresponding "user-defined folder" which was created in block 50 above. Depending on the embodiment preferred, it is also possible to allow users to arbitrarily map any folder on the $3^{rd}$ party service to a desired destination folder on the server, such that messages that are found in the designated $3^{rd}$ party service folder during an import or update would automatically appear in the designated destination folder once aggregation was complete. At the end, the Applet calls a SOAP web service call on the server to update the account import status for this account. The server stores this status to the data base.

Now consider Aggregated Mail Display Process (FIG. 11), wherein at block 53, the user accesses a webpage to view his/her aggregated inbox. At block 54, the server pulls the appropriate email metadata from the data base across all services, based on the display parameters (sort order, filter, number to display per page). At block 55, the server constructs and renders the page with this aggregated list and delivers to client browser for display to the user.

Turn now to View Message Process (FIG. 12). At block 56, the user accesses a webpage to view a particular email message. At block 57, the server renders the requested page, which contains JavaScript constructed to call into the Applet with the requested email ID and delivers to client browser for display to the user. At block 58, the JavaScript on the page calls a method on the Applet with the requested Email ID in order to retrieve the message contents (email body, To/CC recipient lists, attachment list, etc.) from the $3^{rd}$ party service's website. At block 59, the Applet makes a connection to the $3^{rd}$ party service's website. At block 60, the Applet requests the needed page where the message contents reside, and at block 61, the Applet parses the returned HTML page and converts the appropriate message information to XML format. This XML is returned to the calling page. At block 62, JavaScript on the view message page processes this XML and formats the message contents for display to the user.

Consider now Compose Message Process (FIG. 13). At block 63, the user accesses a webpage to compose a new message, reply to an existing message, or forward an existing message. At block 64, the Server renders the compose page. The page is rendered with a list of potential From addresses which is comprised of all the $3^{rd}$ party email accounts the user has setup on the service. At block 65, the Server pre-populates the To/CC recipient address fields and the message body as needed for replies and forwards by parsing this data from the query string. The server delivers to the client browser for display to the user. At block 66, the user selects an account to send from. At block 67, the user composes his/her message and optionally supplies filenames for attachments, if desired. At block 68, the user clicks send, and at block 69, JavaScript on the page calls the send method on the Applet, passing parameters for the desired From address, To/CC addresses, message body, and attachment file list. At block 70, the Applet finds the selected "From" account in its internal service threads (loaded during Applet Initialization Process) and uses it to send the message by connecting to the underlying $3^{rd}$ party website/server and using the normal send facilities on this site/server. At block 71, the compose message page (window) is closed on a success or an error is displayed to the user on a failure.

Account Synchronization Process (FIG. 14) can next be considered. At block 72, the Applet periodically compares the server-side metadata with the underlying third party service provider's data by doing a standard difference operation between email IDs and/or other available metadata. This occurs every n minutes and the steps below are executed once per folder on each service. At block 73, the Applet retrieves the current list of message IDs for a given folder from the server. At block 74, the Applet parses the mail pages on the $3^{rd}$ party service to construct a message ID list for a given folder. At block 75, these two lists are differentiated, and the differences are uploaded to the server as deltas. At block 76, the Server uses the deltas to insert new and delete missing messages for the current folder. At block 77, the Applet's parent web page is notified if changes have been made. At block 78, the parent web page refreshes its list of messages from the data base, if necessary.

Attention is now drawn to New Message Check Process (FIG. 15). At block 79, the Applet periodically checks for new messages on a $3^{rd}$ party service by looking for messages with timestamps newer than the last new message check timestamp. This occurs every n minutes and the steps below are executed once per folder on each service. At block 80, the Applet retrieves the mail message list from the $3^{rd}$ party service, parses the message, and looks for any messages with a timestamp newer than the last stored message on the server. At block 81, if new message(s) are found, the metadata (From, Subject, Date Sent, Attachments flag, read status, etc.) is parsed for each of the new messages. At block 82, the Applet uploads this new metadata to the Server via SOAP web service calls. The server stores this new data to the email metadata table in the data base. At block 83, the Applet calls a JavaScript function on the parent page, notifying it that new mail has been found. At block 84, the parent web page refreshes its list of messages from the data base, if necessary.

Figure 16:
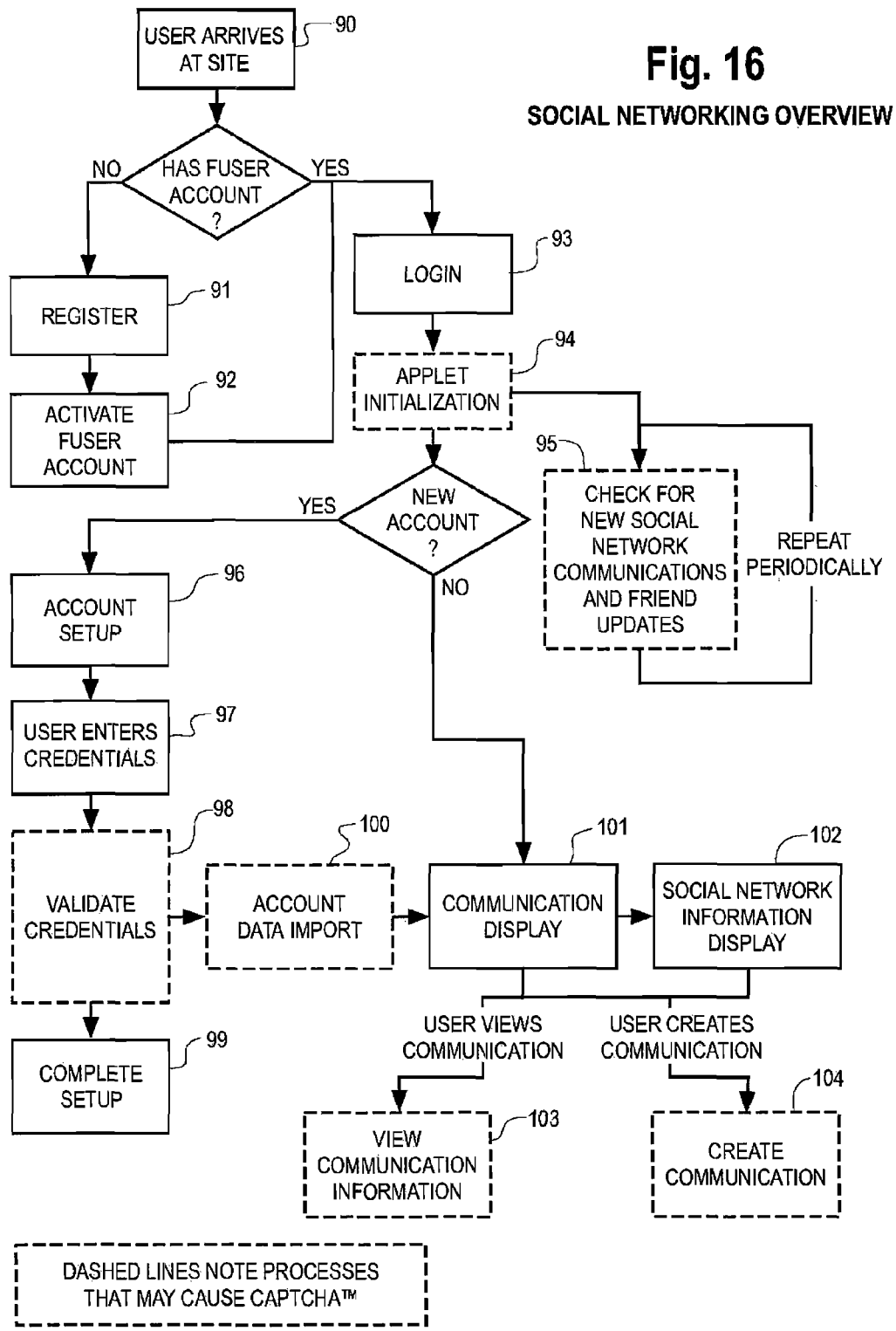
FIG. 16 illustrates an embodiment, with particular regard to a Social Networks.
Figure 17:
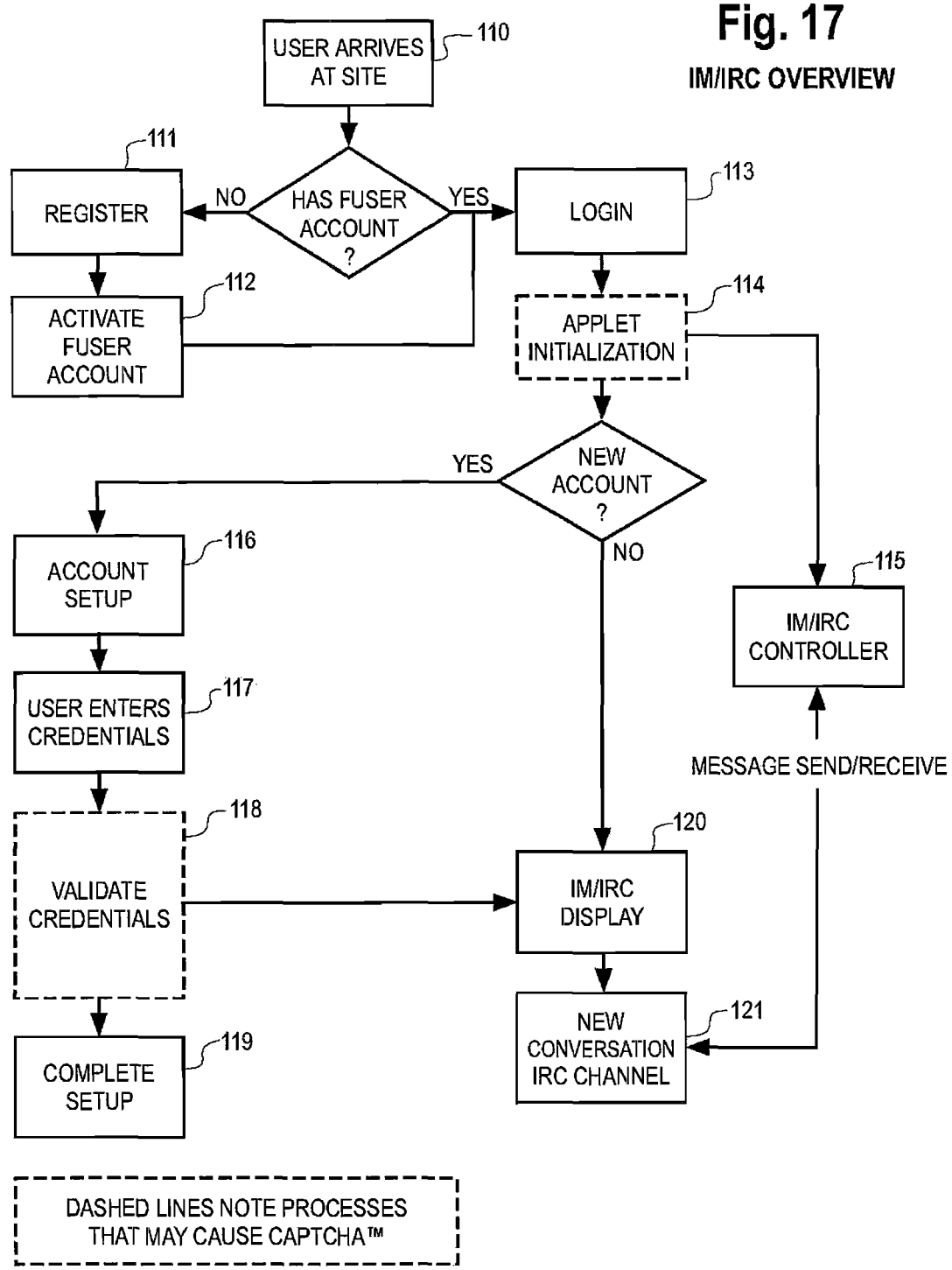
FIG. 17 illustrates an embodiment, with particular regard to Instant Messaging.

FIG. 16 shows another example embodiment of the invention, aggregating social networking instead of email messages. The process is identical to that for email, with the exception that the information being aggregated could consist of any of the various social networking communiqués, such as messages, comments, wall posts, etc. In addition to communications, social network profile and friends lists would be aggregated as well, opening up numerous potential secondary features such as:

Combine friend information from various sites into unified displays
  Show aggregated list of updates from friend pages
  Show GPS information on friends (using maps)
  Online status (which sites)
  Communications leaderboard—social networking friends are rank ordered based on the # of communications received from that friend during a designated time period.
  Broadcast updates/messages to multiple sites/pages
  People you should know (friends of friends)
  Various inbox message types
  SMS messages sent to phone whenever changes or events occur on friends' social networking profile pages
  Degrees of separation display—how many degrees of separation are you from famous/notable social networkers or other user-defined social networkers
  Find friends with similar interests, topics, pages (we found these for you)
  Access via mobile phone or other mobile device
  Social networking integration with XBOX Live
  Profile Images
  Introduce friends
  What am I doing now display
  Profile Editing
  Page Editing
  Notification to IM Client of changes to friends pages
  Games, e.g. an online version of tag made using social networking communications
  Share RSS feeds or RSS favorites
  Karma point tracking—users can award (or subtract) other user's karma points for good/bad deeds FIG. 17 illustrates a sample embodiment for aggregating instant messaging accounts. The process is identical to that for email, the primary difference being the nature of the communications being aggregated.

Figure 18:
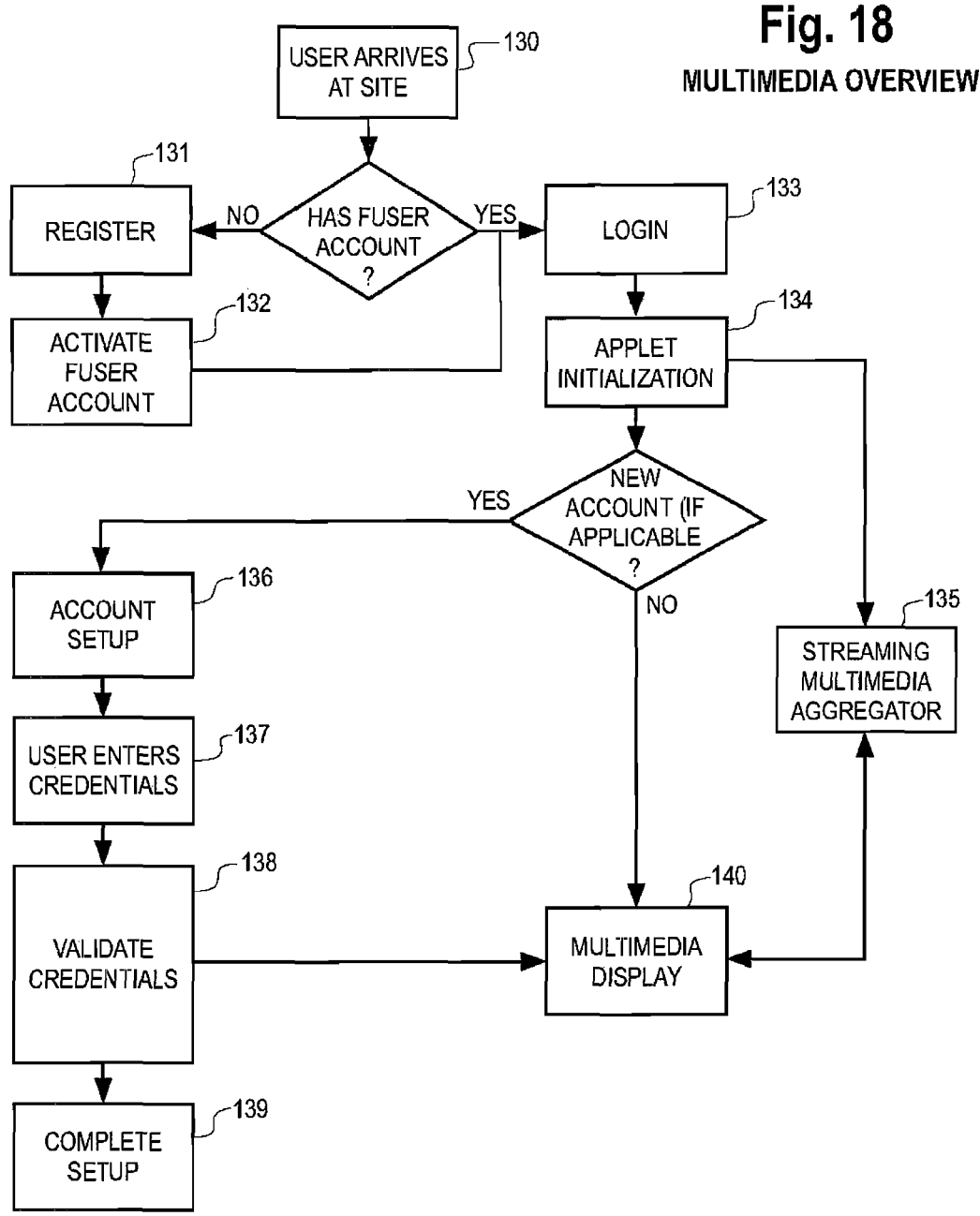
FIG. 18 illustrates an embodiment, with particular regard to Multimedia.

FIG. 18 illustrates a sample embodiment for aggregating multimedia, i.e., streaming video, audio, images, etc. The process is identical to that for email, the primary difference being that media from different sources is aggregated into a single interface rather than email.

Figure 19:
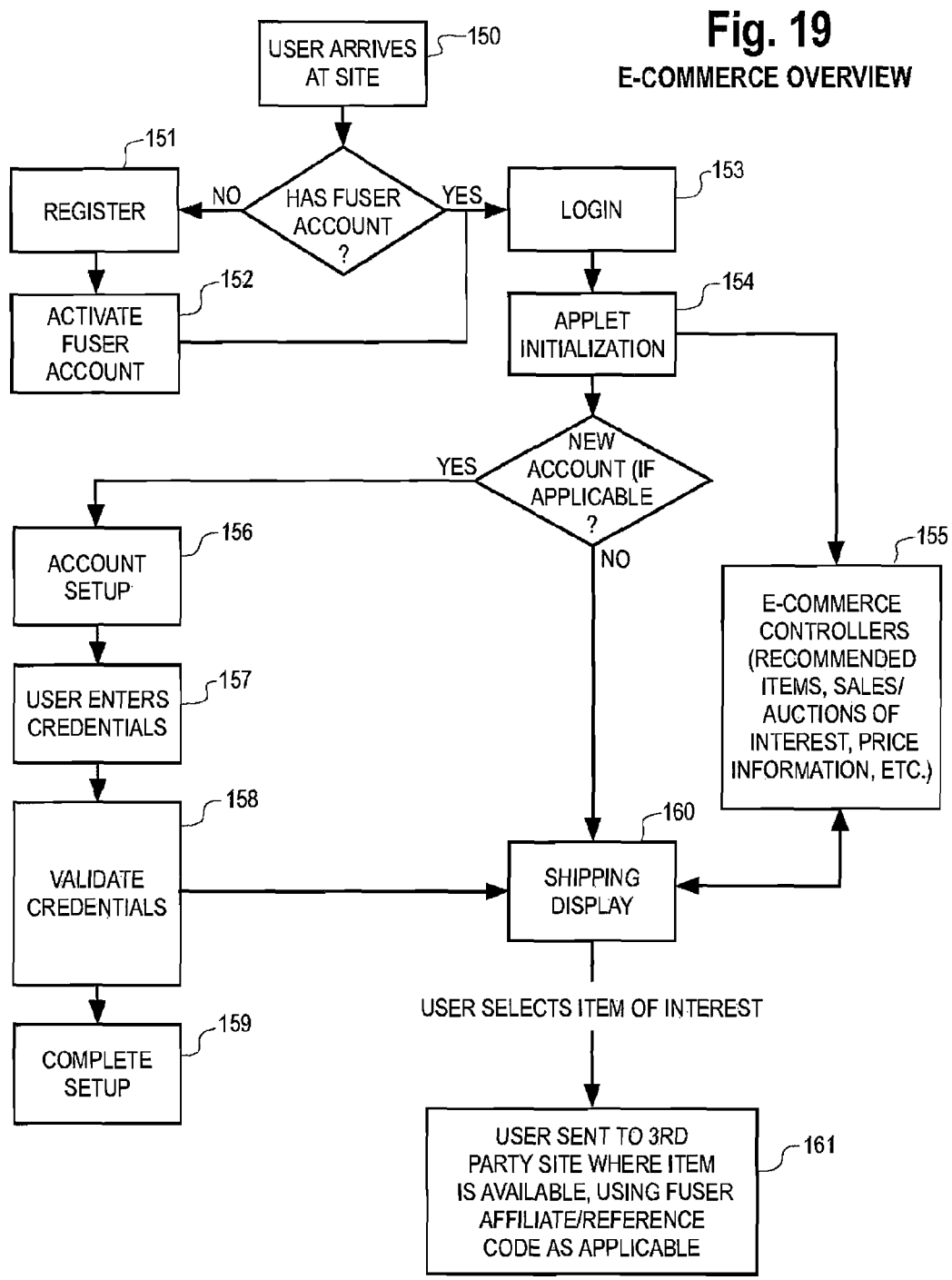
FIG. 19 illustrates an embodiment, with particular regard to Ecommerce.

FIG. 19 illustrates a sample embodiment for aggregating e-commerce sites. The process is identical to that for email, the primary difference being that pricing, recommended items, sales ads, auctions of interest, etc. are being pared and aggregated for the user.

Figure 20:
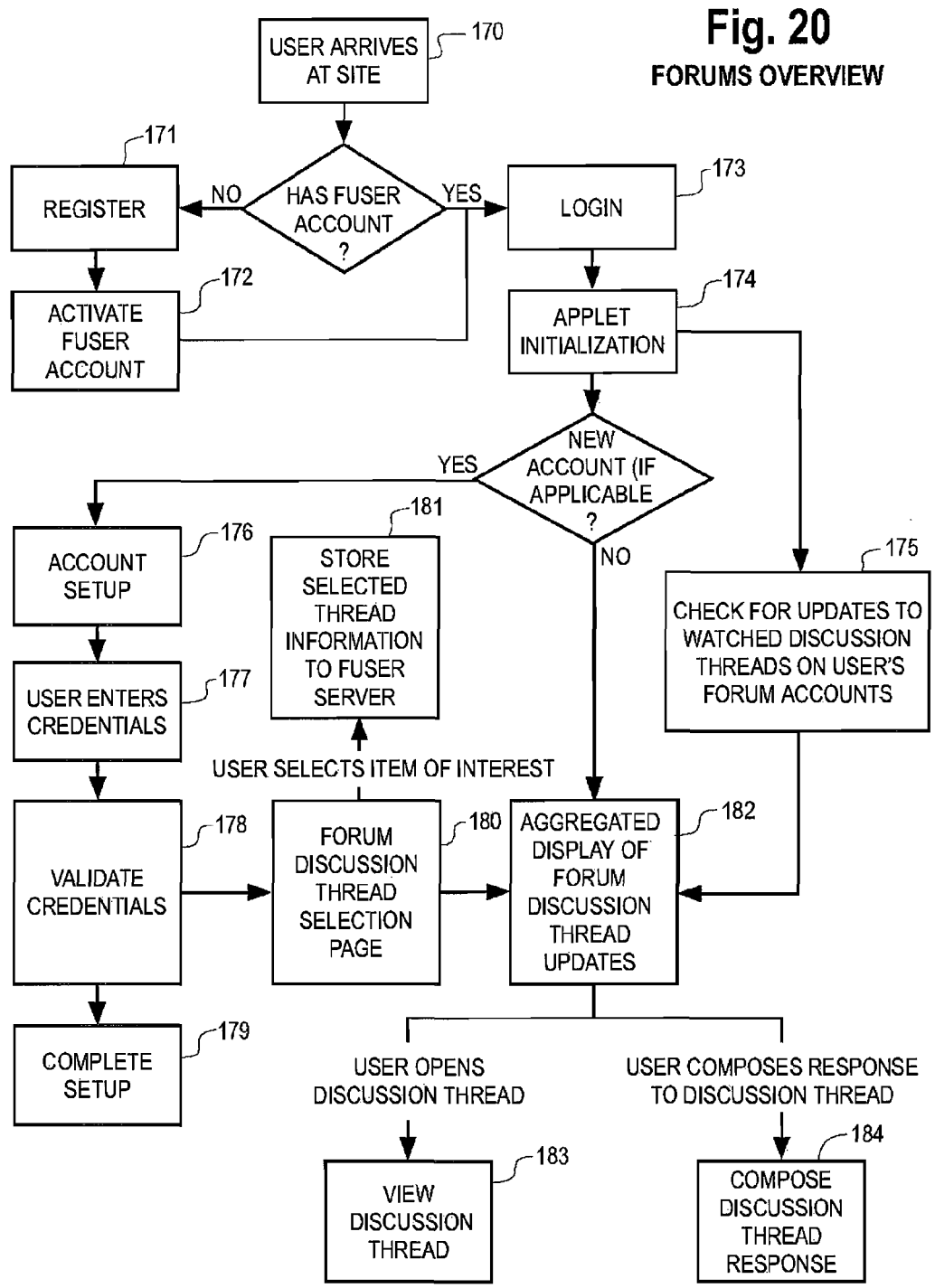
FIG. 20 illustrates an embodiment, with particular regard to Forums.

FIG. 20 illustrates a sample embodiment for aggregating data from 3$^{rd}$ party forums. The process is identical to that for email, the primary difference being that forum threads and posts from different 3$^{rd}$ party sites are aggregated rather than email. In this case, a notification framework for when new messages are posted to a selected thread of interest is shown. After setting up services for all of the 3$^{rd}$ party forum sites of interest (at blocks 176-179), the user can then select which message threads on those sites are of interest to monitor (at blocks 180/181). The aggregated display (at block 182) then contains only the threads of interest and updates to those threads are indicated as new messages in the aggregated inbox. These thread update notifications can be replied to, which replies to the thread on the underlying forum (at block 184). For example, the 3$^{rd}$ party forum software can be "Community Server", that is provided by Telligent Systems. However, the user interface for the 3$^{rd}$ party forum software can be modified as may be desired.

Figure 21:
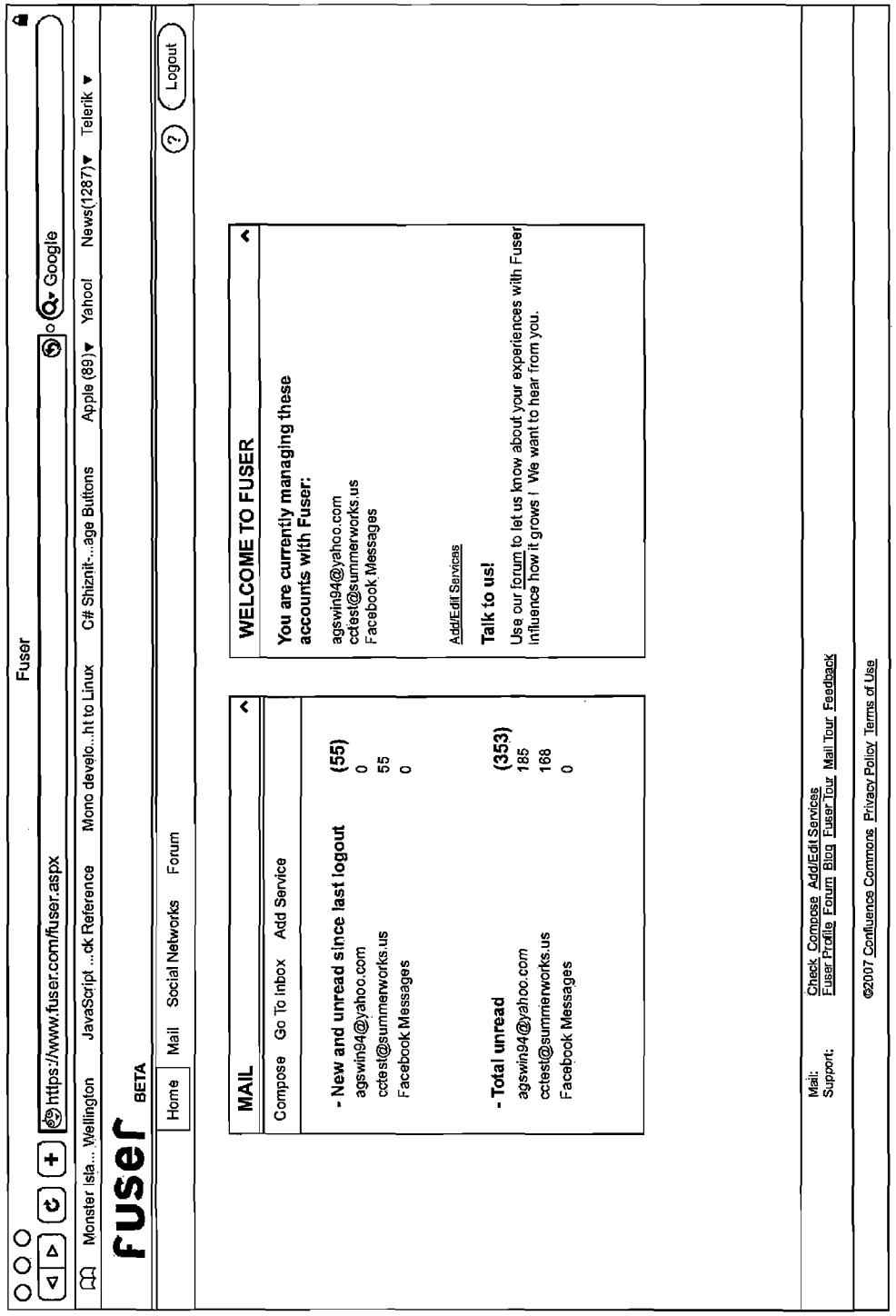
FIG. 21 illustrates an embodiment, with particular regard to a user interface.

FIGS. 21-32 provide illustrative embodiments of user interfaces. FIG. 21, for example, illustrates a Home Page Overview. The home page shows a "dashboard" display of the current status across all aggregated accounts, including email and social networking accounts. In this case, two email accounts and a social networking account are shown and the number of unread messages is summarized. Additional summary type data culled from aggregation can be displayed here in the future.

Figure 22:
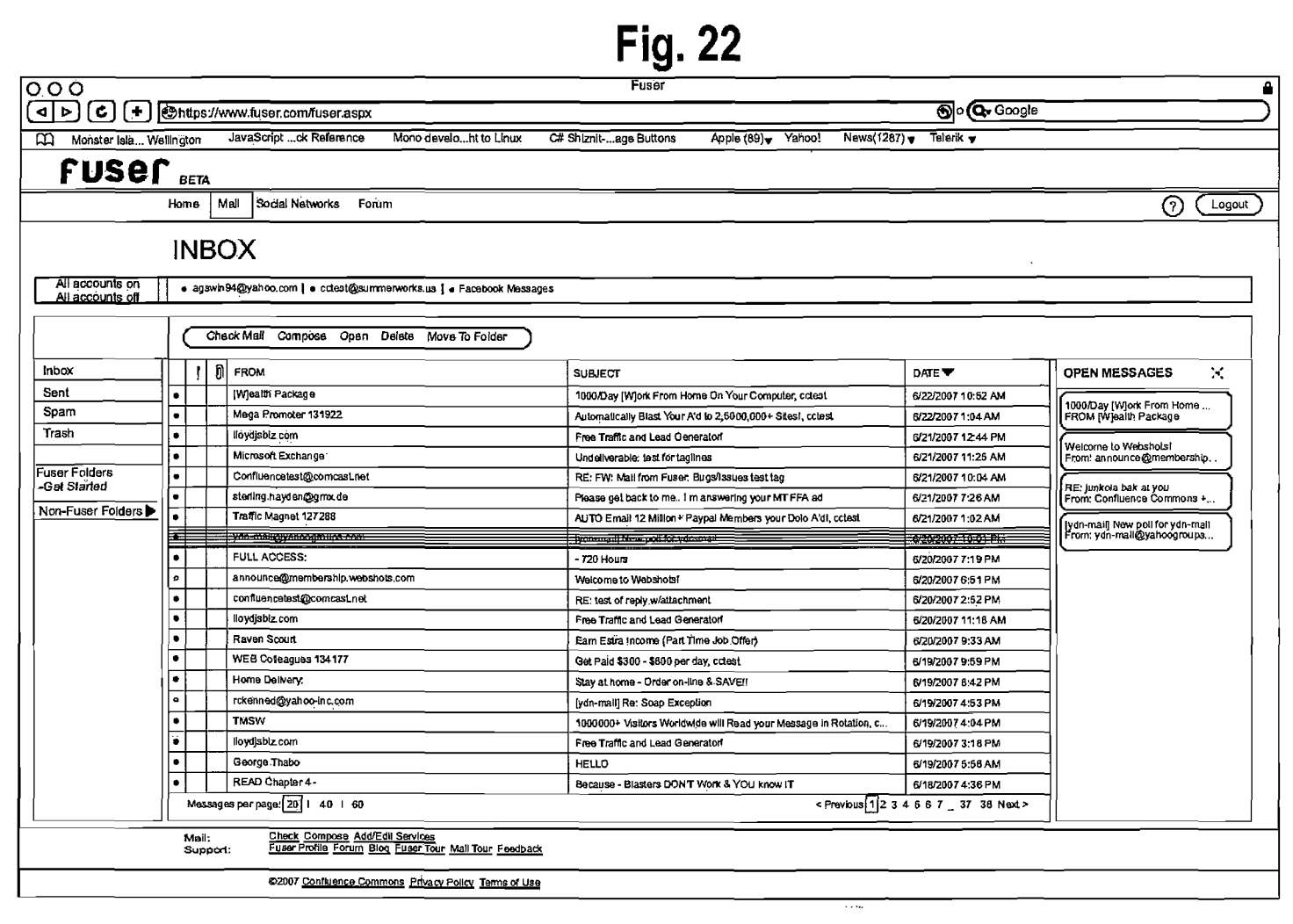

FIG. 22 shows an example of an Aggregated Inbox Overview. The aggregated inbox shows a detail view of all aggregated message data for the current user. In this case, the first page of messages is shown for two email accounts and a social networking account. Accounts are color coded for easy identification of what service an individual message is associated with. The page also supports enabling/disabling of accounts by clicking on the color-coded account name in the top bar, to allow filtering of which accounts data is displayed from. Typical email interface operations such as column sorting, grid pagination, folders, messages to display per page, etc. are supported.

Figure 24:
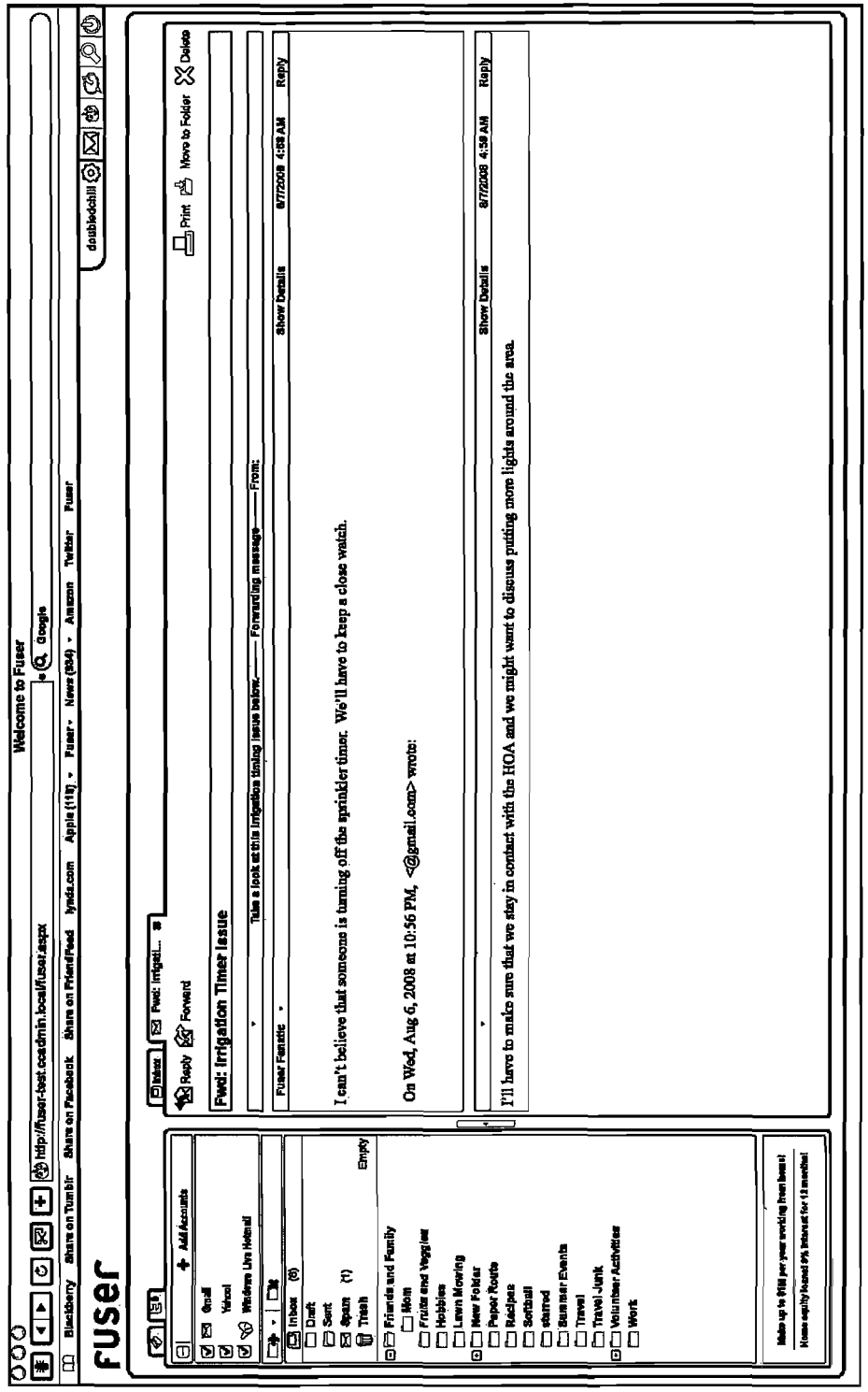
FIG. 24 illustrates an embodiment, with particular regard to a multi-threaded message screen shot depicting a threaded message view within Fuser, and further showing a folder hierarchy relating to a synched folder system.
Figure 25:
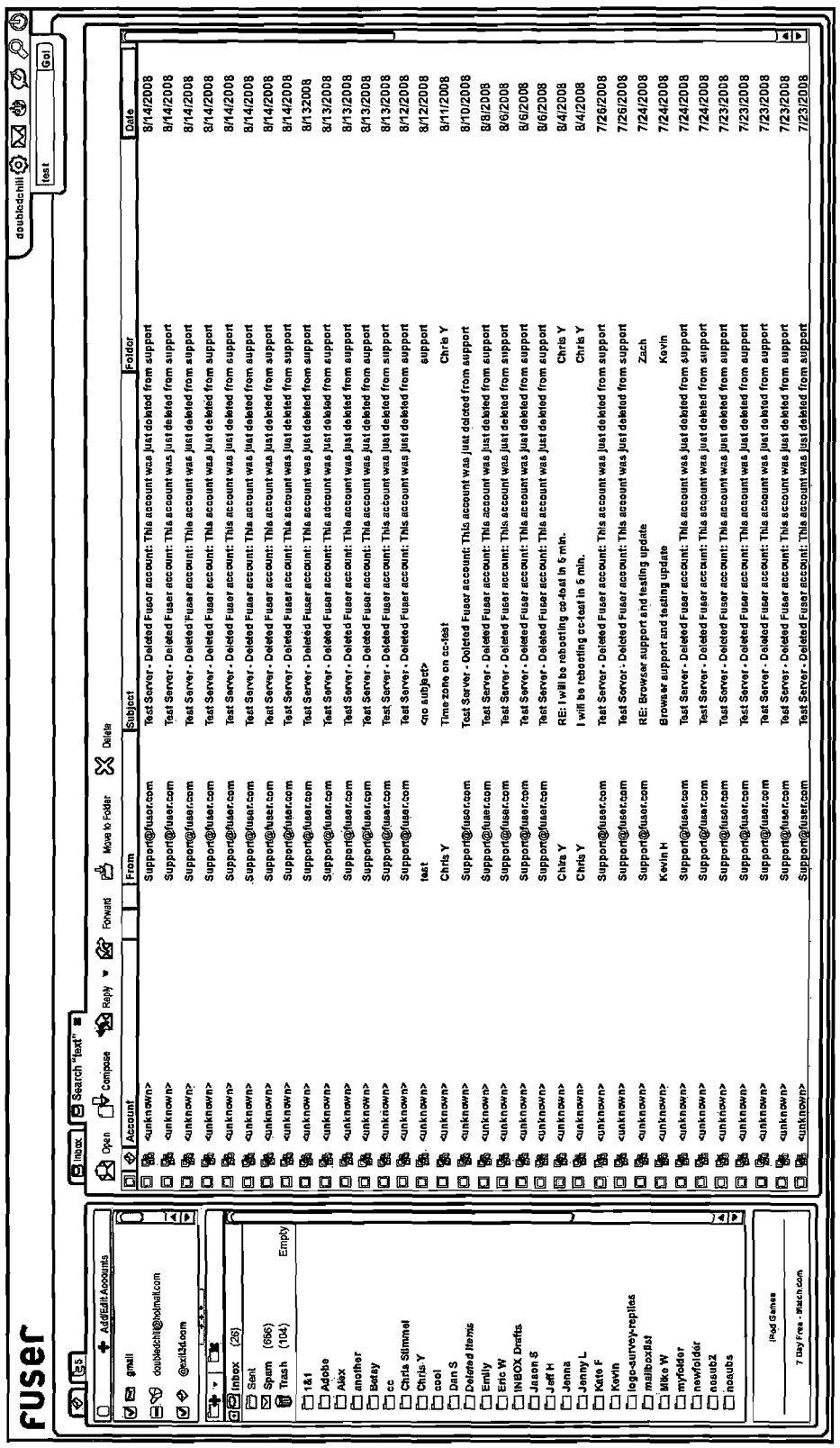
FIG. 25 illustrates an embodiment, with particular regard to a Search screen shot depicting a search form and search result display, and further showing a folder hierarchy relating to a synched folder system.

FIG. 24 provides an example of a Communication Leaderboard Overview. The Social Networks Communications Top 48 Leaderboard is a summary of the user's most frequent social networking correspondents. The Leaderboard ranks friends based on the frequency of their correspondence, calculated by combining the total of messages and wall posts (Facebook) or messages and comments (MySpace), for the time period the user selects. Color-coding identifies the social network of the friend. In another embodiment, rather than the—say—top 48, the number is user-selectable. For example, a radio-button choice can be provided at a user interface. The display at the user interface can also be filterable based on the service provider. For example, the service providers of Myspace and Facebook can be aggregated, or the user can selectively filter out one of these providers.

Depending on the implementation preferred, a summary panel on the user interface can display (e.g, randomly selected) Friends' pictures and/or recent (e.g., 2 most recent) communications received from the social network(s).

Other Features

The foregoing is, again, illustrative. Thus, variations on the theme can be carried out depending on the particular implementation desired in one situation or another. Here are a few other features that can be utilized, if so desired.

Aggregation of Aggregators.

One embodiment is to aggregate from aggregators, thereby achieving a broader reach of third party source systems. For example, the third party service provider systems described throughout this document can themselves be aggregators, e.g., an Internet Service Provider like AOL, MSN, Yahoo, Google, etc. can incorporate aggregation into their systems. Then, such a third party service provider can include an aggregator component to aggregate from other third party servers (service providers), e.g., AOL could provide an aggregation of MSN, Yahoo/SBC, etc. It is possible to aggregate in tiers too, such as a master server system aggregating from, say, AOL, which itself aggregates from MSN, etc., which in turn aggregates from Yahoo, etc.

Security Response.

Third party systems can have a security response to aggregating, e.g., to block or prevent—or at least attempt to block or prevent—a master server system from an embodiment aggregating content or data held on a source web system. The security response to an aggregator system can be crude, e.g., the third party service provider can require users to contractually agree not to aggregate from their site, e.g., by means of an on-line contract, or more softly, warning or rule. Other third party security responses to an aggregator system can include: Blocking an IP address or range of IP addresses; inserting dynamic content or changing the DOM structure of the underlying source code of the page such that it randomly affects the parsing of the page; Challenging the client with additional prompts for usernames, passwords, or image verification; etc. To particularize one of these examples, for an embodiment where the parsing keys off of elements in the page having certain names or being in a certain place within the structure of elements on the page, changing the names or this structure could foil the page parsing logic. For instance, if the aggregator was looking for a textbox called EmailAddress on a page to get the user's email address and the 3$^{rd}$ party site changed the name of this textbox to MessUpFuserEmailAddress or some random name like EmailAddress 101, it would break the parsing of that page to make it hard to automatically find the information being sought by the aggregator. (As used herein, "fuser" or "Fuser" refers to an illustrative master server system 4.) A security response by a third party service provider to an aggregator system (e.g., to prevent, obstruct, confuse the aggregation functionality) is an embodiment of the system herein disclosed.

Aggregator Third Party Communication Embodiment

The third party source systems are not in conflict with an aggregation system, at least because the aggregation system enables the user to handle his or her data and manage content provided to the user, e.g., by providing user-enabled content management. It is more of a symbiotic relationship, wherein the aggregator can help users make best use of their third party systems, and the third party systems can experience more user traffic facilitated by the aggregator systems. Thus, embodiments herein can have the master server system provide to the user system hyperlinks or network address information to enable joining or expeditiously communicating with various third party service providers. For example, a link or button can be provided to the user computers 2 to enable expeditious viewing of a third party service provider's home page or some other page offered to users. If desired, advertising can be added to the Home Page, Inbox Page, or other aggregator page.

Modification of Outlook Embodiment

Another manner of implementation is to modify a client or browser, such as Firefox or Microsoft's Outlook, to handle some or all of the aforesaid client-side aggregating. The modification could be carried out as a plug in to the browser. Such an embodiment could operate in conjunction with the above-mentioned master server system 4. In the case of an Internet Service Provider (ISP) such as Microsoft, the ISP can be the master server system 4.

Error Handling

Errors can be generated in many areas of functionality in an aggregator system, for example at a web site, at the aggregators web service, in a data base, in an applet, etc. For each of these areas there can be multiple error conditions. In one embodiment, an aggregator can implement programmed intelligence to handle and process errors. For example, when an error is detected or trapped, the aggregator can present an error code to the user interface to trigger presentation of a message to the user, e.g., instructing the user to change a page or to go to a page or take to some other action. Unhandled errors can be accommodated, and for errors that do not match an error code, an instruction can be sent to the user interface to inform the user that a particular action has occurred. Preferably the user is not only informed that there was an error, but is also presented with an instruction, such as to try again, or click a link.

Server-Side Embodiment

Server-side embodiments, though encompassed herein, are believed to be slower than client-side embodiments, as regards presentation to the user computer of real-time communications. This is especially true where downloads occur in a background mode (as Outlook does) or where the Fuser client opens parallel sessions at startup (something Outlook apparently cannot do). The speed is attributable to having one less link in the communication chain, i.e., instead of third-party servers communicating real-time communication to the server-side implementation, that relays the real-time communication to the user computer, the server-side relaying is taking out of the chain of communication with a client-side embodiment.

Computer-Readable Media

Note that embodiments herein are directed to the computer-readable media tangibly embodying program instructions to carry out operations mentioned herein.

Review again the foregoing figures from a functional perspective. First note again that an aggregation can be formed server side, client side, or both. That is, though not shown in FIGS. 1-6, it is entirely possible to configure an aggregation system such that a master server system 4 that is interposed between the user computer system 2 and the third party server systems 6. In another embodiment, the system can be configured such that there is more accessing and aggregating processing occurring on the client side than on the server side, with "more" extending up to the accessing being performed only at the client side. Thus, if one prefers, the aggregation system can be configured such that the master server system 4 is not in communication with the third party servers in carrying out the aggregation. Consider, for example too, a system in which the user computer system 2 is enabled to function as a proxy between the master server system 4 and the third party server systems 6. Phrased differently, a user computer system 2 can be interposed between (i.e., via a segment of the Internet or other network) allowing communication between the user computer system 2 and at least one server system 4, and (other segments) allowing communication between the user computer system 2 and a plurality of third party server systems 6, with the at least one server system 4 enabling the user computer system 2 to access the plurality of third party servers.

When it comes to speed of aggregating real-time information, it is believed that a client-side aggregation is faster than server-side aggregating because there is one less link in the communication chain in forming the aggregation. Server-side processing may be more suitable for mobile applications. User computer systems 2 may have different capabilities, which can be reflected in whether certain processing best occurs server side or client side.

With particular relevance to a client-side embodiment, there can be a master server system 4 programmed to provide credentials (e.g., whatever is needed for a log-in) to a browser of, or otherwise to, a user computer system 2. There can be a client-side application piece, such as a Java-based application, applet, etc., at the user computer system 2. The client-side piece can be adapted to receive the credentials and to communicate respective portions of the credentials to obtain access to each of a plurality of third party server systems 6, and to enable the user computer system 2 to aggregate information from the third party server systems 6.

The aggregated information can be stored to a data base and/or presented in a human-discernable manner (e.g., display, sound, etc.) at the user computer system 2. For example, the user computer system 2 can be made capable of displaying, within at least one window, the aggregation, and if preferred, along with an indication of the third party server systems. More particularly, the aggregation can be comprised of email messages from each of the third party server systems, and the indication can include a visual signal of which of the particular said third party server systems 6 corresponds to a particular one of the email messages. In another manner of presenting the information, the user computer system can be capable of displaying, within at least one window, a unified presentation of communications from more than one social network. Presentation of the aggregation can be subject to definition by the user computer system 2.

There can be an automatic log-in to each of the third party server systems 6 or by a user-selectable button or link for each said third party server system 6. (In any case, the user computer system 2 can also be provided with a user a button or link to at least one particular page within at least one of said third party server systems 6, so as to conveniently enable the user to efficiently view any page.)

In an interesting way of phrasing an embodiment, the user computer system 2 can receive, from the master server system 4, respective credentials for accessing each of a plurality of third party server systems and then implement the received access credentials to produce an aggregation of information. That is, prior to receiving the respective credentials, the user computer system 2 communicates the respective credentials to the master server system 4, which conveys them back to the user computer system 2 in a manner accessible by the client-side application piece. Accordingly, transmitted information between the client-side application and the server-side application can enable aggregating the communications into a presentation at the user computer system.

In some embodiments, then, the mere logging in by the user computer system 2 at the master computer system 4 or a web page of the system 4 can trigger formation of an aggregation. Consider a web page in communication with a user device such as user communications computer system 2. The communication can enable communicating a computer program to the user device, the computer program providing network address instruction to the user device and automatically facilitating authentication at the address. The program can direct scraping of data from a web page accessible at the address and presenting, at the user device, a page populated with the data. This can all be done without user intervention beyond logging on to the master server system 4.

Continuing on, the aggregator system—depending on the embodiment preferred—include one or more of the following: a controller for obtaining information from the third party server systems; a content parser to parse the information obtained from the third party server systems; and a content renderer to render to the user computer system information obtained from the third party server systems. The master server system 4 can make at least one of the following components accessible to the user computer system 2: Email, social network, job search, shopping, news, instant messaging, Internet television, value-added services, and public aggregation.

In such an aggregation system consider the following examples of what may be aggregated. The aggregation can include one or more of the following: text communications, voice communications, video communications, and multimedia communications. Communications aggregated at the user computer system 2 can also include feeds, such as Internet radio, Internet television and/or other multimedia. The text communications can include email, sms messages, and instant messages. Other communications can include telephone messages, and web site information. In the situation of an aggregator of an aggregator (e.g., at least one of the third party servers 6 is itself an aggregator) an aggregation can include another aggregation.

The aggregation can be formed, for example, by having the master server system 4 provide a template to the user computer system 2 and enabling the system 2 to form a page by populating the template with data scraped from a plurality of third party servers 6. In such an embodiment, the master server system need not receive the page. That is, for example, the master server system 4 can provide a web page template to the user computer system 2 along with logic to parse information obtained from the third party server systems 6. This permits accessing, at respective user interfaces, the third party server 6 web pages, parsing the web pages for data elements, and reformatting the data elements to produce an aggregation of, say, email in at least one of a unified user interface or a data base. Note that the aggregation can be intelligent, e.g., if that which is being aggregated comprises email, there can be a dynamic discovery of an email service type and configuration.

As previously mentioned, there can be a data base, accessible to the master server system 4, and structured to receive at least some of the data from the user computer system 2. At least some data from the aggregation can be saved to produce a subsequent aggregation by fetching new data, and combining the new data with the saved data. The data base can include at least some encrypted information, including user names and user passwords for each of the plurality of third party server systems 6. In some embodiments, any information communicated between the client side and server side applications can be encrypted. Text of email mail and instant messages can be encrypted. In the case of encrypted information obtained from at least one of the third party servers, there can be an aggregation of encrypted information that can be unencrypted for presentation to at the user computer system 2.

Beyond being an aggregator, the master server system 4 can be an Internet portal, and/or provide its own community. As such, the master server system 4 is capable of aggregating various contacts lists to form an aggregated contacts list and storing the aggregated contacts list; aggregating various friends lists to form an aggregated friends list and storing the aggregated friends list; and/or aggregating various profiles from more than one social network and storing the aggregated profiles.

In response to an attempt to form an aggregation, however, there can be a security response at a third party server system 6. The security response can be adapted to interfere with at least one of the operations of accessing the third party server system 6, accessing the third party server system 6 by the master server system 4, the obtaining user-accessible information from the third party server system 6, or aggregating the user-accessible information.

Though just as the aggregator embodiments herein are viewed as inventive, so is a security response to them, again an aggregation system can have a symbiotic relationship with the third party server systems 6, respectful them by even by facilitating their use. The facilitating can include providing, at the user computer systems 2, with a link or button to view whatever of the user's data or user-accessible data on the third party server 6 site that may be efficiently desired by a user.

In any case, there are many of variations that may utilize the teachings herein, depending on the particular implementation preferred in one situation or another. Thus, the terms and expressions which have been employed herein are used as terms of teaching and not of limitation, and there is absolutely no intention, in the use of such terms and expressions, of excluding equivalents of the features shown and described, or portions thereof, it being recognized that various modifications are possible within the scope of the embodiments contemplated and suggested herein. Similarly, the disclosure herein has been described with reference to embodiments, and the disclosures are intended to be illustrative and are not intended to be limiting. Various modifications and applications may occur to those skilled in the art without departing from the true spirit and scope of what is communicated hereby, as defined in the appended claims.

Thus, although only a few exemplary embodiments have been described in detail above, those skilled in the art can readily appreciate that many modifications are possible in the exemplary embodiments without materially departing from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

We claim:

1. A computerized aggregation system, the system including: a master server system programmed to receive data from a user computer, to store the received data, and to process the received data to produce information including credentials, and to provide the information to a client-side application piece at the user computer system, the user computer system adapted to receive said provided information and to communicate said credentials received from the master server system respectively to each of a plurality of third party server systems to facilitate obtaining information from the third party server systems, whereby the user computer system is enabled to aggregate at least some information from the third party server systems on an aggregation template.

2. The aggregation system of claim 1, wherein the user computer system is a mobile communication device.

3. The aggregation system of claim 1, wherein the user computer system is a smart phone.

4. The aggregation system of claim 1, wherein the information comprises a notification with a client-side piece.

5. The aggregation system of claim 1, wherein the information comprises a text message.

6. The aggregation system of claim 1, wherein the information comprises a voice mail message.

7. The aggregation system of claim 1, wherein the information comprises multiple data types.

8. The aggregation system of claim 1, wherein the information comprises a social network update.

9. The aggregation system of claim 1, wherein the information comprises a photograph.

10. The aggregation system of claim 1, wherein the information comprises a video.

11. The aggregation system of claim 1, wherein the information comprises a friend request.

12. The aggregation system of claim 1, wherein the information comprises location-related information generated through use of GPS.

13. A method of making an aggregation apparatus, the method comprising:
   programming a computer of a master server system, the master server system comprising an output device and networking hardware to connect the master server system to a network, with program instructions so that the master server system:
   receives data from a user computer, stores the received data, processes the received data to produce information including credentials, and provides the information to a client-side application piece at the user computer system which is adapted to receive said provided information and to communicate said credentials received from the master server system respectively to each of a plurality of third party server systems to facilitate obtaining information from the third party server systems, whereby the user computer system is enabled to aggregate at least some information from the third party server systems on an aggregation template.

14. The method of claim 13, wherein the user computer system is a mobile communication device.

15. The method of claim 13, wherein the user computer system is a smart phone.

16. The method of claim 13, wherein the information comprises a notification with a client-side piece.

17. The method of claim 13, wherein the information comprises a text message.

18. The method of claim 13, wherein the information comprises a voice mail message.

19. The method of claim 13, wherein the information comprises multiple data types.

20. The method of claim 13, wherein the information comprises a social network update.

21. The method of claim 13, wherein the information comprises a photograph.

22. The method of claim 13, wherein the information comprises a video.

23. The method of claim 13, wherein the information comprises a friend request.

24. The method of claim 13, wherein the information comprises location-related information generated through use of GPS.

25. A method of using an aggregation apparatus, the method comprising:
   operating a computer of a master server system which is connected by networking hardware to a network and which is programmed, so that the aggregation apparatus performs the operations of:
   receiving, by the master server system, data from a user computer,
   storing the received data,
   processing the received data to produce information including credentials, and
   providing the information to a client-side application piece at the user computer system which is adapted to receive said provided information and to communicate said credentials received from the master server system respectively to each of a plurality of third party server systems to facilitate obtaining information from the third party server systems, whereby the user computer system is enabled to aggregate at least some information from the third party server systems on an aggregation template.

26. Computer-readable media, tangibly embodying non-transient program instructions, which when executed, at an aggregation apparatus operably associated with networking hardware to connect the computer system to a network, will cause the aggregation apparatus to carry out the operations of:
   receiving, by the master server system, data from a user computer,
   storing the received data,
   processing the received data to produce information including credentials, and
   providing the information to a client-side application piece at the user computer system which is adapted to receive said provided information and to communicate said credentials received from the master server system respectively to each of a plurality of third party server systems to facilitate obtaining information from the third party server systems, whereby the user computer system is enabled to aggregate at least some information from the third party server systems on an aggregation template.

* * * * *